United States Patent
Chang et al.

(10) Patent No.: US 9,865,107 B2
(45) Date of Patent: Jan. 9, 2018

(54) METHOD FOR PERFORMING AUTHENTICATION AND ELECTRONIC DEVICE THEREOF

(71) Applicant: Samsung Electronics Co., Ltd., Suwon-si, Gyeonggi-do (KR)

(72) Inventors: Moon-Su Chang, Yongin-si (KR); Yang-Soo Lee, Yongin-si (KR); Joo-Yeon Lee, Seoul (KR); Dong-Hyun Yeom, Bucheon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/160,686

(22) Filed: May 20, 2016

(65) Prior Publication Data
US 2017/0004665 A1    Jan. 5, 2017

(30) Foreign Application Priority Data

Jun. 30, 2015 (KR) ........................ 10-2015-0092979

(51) Int. Cl.
| | | |
|---|---|---|
| *G05B 19/00* | (2006.01) | |
| *G05B 23/00* | (2006.01) | |
| *G06F 7/00* | (2006.01) | |
| *G06F 7/04* | (2006.01) | |
| *G06K 19/00* | (2006.01) | |
| *G08B 29/00* | (2006.01) | |
| *G08C 19/00* | (2006.01) | |
| *H04B 1/00* | (2006.01) | |
| *H04B 1/38* | (2015.01) | |
| *H04B 3/00* | (2006.01) | |

(Continued)

(52) U.S. Cl.
CPC ...... *G07C 9/00111* (2013.01); *G07C 9/00166* (2013.01); *G07C 9/00309* (2013.01); *H04L 67/12* (2013.01); *H04W 12/06* (2013.01); *G07C 2009/00357* (2013.01); *G07C 2209/04* (2013.01); *G07C 2209/63* (2013.01)

(58) Field of Classification Search
CPC ............ G07C 9/00111; G07C 9/00309; G07C 9/00166; G07C 2009/00357; G07C 2209/04; G07C 2209/63; H04W 12/06
See application file for complete search history.

(56) References Cited

U.S. PATENT DOCUMENTS

| | | | |
|---|---|---|---|
| 7,568,616 B2 | 8/2009 | Zuili | |
| 8,646,060 B1 * | 2/2014 | Ben Ayed | ........... H04L 63/0853 726/9 |

(Continued)

FOREIGN PATENT DOCUMENTS

EP     2 672 464 A1    12/2013

Primary Examiner — Erin File
(74) Attorney, Agent, or Firm — Jefferson IP Law, LLP

(57) ABSTRACT

A method and an apparatus for performing authentication are provided. The method includes performing, by a first authentication unit in a first electronic device, authentication with respect to a second electronic device that requests authentication through a first communication mode and when the second electronic device is authenticated, transmitting first information used for controlling the first electronic device to the second electronic device through the first communication mode and transferring second information indicating that the second electronic device is authenticated to a second authentication unit in the first electronic device.

20 Claims, 13 Drawing Sheets

(51) Int. Cl.
*H04Q 1/00* (2006.01)
*H04Q 9/00* (2006.01)
*G07C 9/00* (2006.01)
*H04W 12/06* (2009.01)
*H04L 29/08* (2006.01)

(56) References Cited

U.S. PATENT DOCUMENTS

| | | | |
|---|---|---|---|
| 2003/0139179 | A1 | 7/2003 | Fuchs et al. |
| 2004/0104804 | A1 | 6/2004 | Sugawara |
| 2004/0236819 | A1* | 11/2004 | Anati ............ G06F 21/445 709/200 |
| 2007/0136596 | A1* | 6/2007 | Adiletta ........... H04L 63/0869 713/176 |
| 2010/0075655 | A1 | 3/2010 | Howarter et al. |
| 2010/0293250 | A1* | 11/2010 | Ankaiah ............ H04L 12/56 709/219 |
| 2011/0028091 | A1 | 2/2011 | Higgins et al. |
| 2012/0220268 | A1* | 8/2012 | Smith ............ H04L 12/5815 455/411 |
| 2013/0208890 | A1 | 8/2013 | Weghaus |
| 2014/0049361 | A1 | 2/2014 | Ahearn et al. |
| 2014/0298431 | A1* | 10/2014 | Kim ................ H04L 63/08 726/5 |
| 2014/0359732 | A1* | 12/2014 | Kuroda ............ H04W 12/06 726/6 |
| 2015/0334245 | A1* | 11/2015 | Lin ................ H04M 3/567 370/261 |

* cited by examiner

METHOD FOR PERFORMING AUTHENTICATION AND ELECTRONIC DEVICE THEREOF

CROSS-REFERENCE TO RELATED APPLICATION(S)

This application claims the benefit under 35 U.S.C. §119 (a) of a Korean patent application filed on Jun. 30, 2015 in the Korean Intellectual Property Office and assigned serial number 10-2015-0092979, the entire disclosure of which is hereby incorporated by reference.

TECHNICAL FIELD

The present disclosure relates to a method for performing authentication and an electronic device thereof. More particularly, the present disclosure relates to a method for performing authentication between electronic devices that are capable of communicating through a plurality of communication modes.

BACKGROUND

A method for controlling the authority to use a vehicle has been changed from a classical method that uses a key to a remote control method that uses a radio frequency (RF) key fob or similar device. A smart key method that controls a vehicle using a portable electronic device (such as a smart phone, tablet personal computer (PC), and the like) without using a key is also widely used as a desirable method of controlling the authority to use a vehicle.

Further, in association with a method of controlling a vehicle, a wearable device may replace the smart key, or a method of controlling a vehicle using a mobile device and a network may be introduced irrespective of distance, unlike the existing key system.

When an electronic device (such as a smart phone, tablet PC, wearable device, and the like), controls a vehicle, a process in which the vehicle authenticates the electronic device is required. According to the related art, an independent authentication procedure exists for each communication mode that is performable between the electronic device and the vehicle, and the authentication procedure for each communication mode does not typically interwork with one another. Thus, an authentication procedure needs to be performed for each communication mode, which is a significant drawback associated with the related art. Also, when an authentication result is simply shared so as to connect the authentication procedure for each communication mode, the level of security may deteriorate.

The above information is presented as background information only, and to assist with an understanding of the present disclosure. No determination has been made, and no assertion is made, as to whether any of the above might be applicable as prior art with regard to the present disclosure.

SUMMARY

Aspects of the present disclosure are provided to address at least the above-mentioned problems and/or disadvantages and to provide at least the advantages described below. Accordingly, an aspect of the present disclosure is to provide electronic devices which can perform authentication between the electronic devices that are capable of communicating through a plurality of communication modes.

In accordance with an aspect of the present disclosure, a method for performing authentication in a first electronic device is provided. The method includes performing, by a first authentication unit in the first electronic device, authentication with respect to a second electronic device that requests authentication through a first communication mode, and when the second electronic device is authenticated, transmitting first information used for controlling the first electronic device to the second electronic device through the first communication mode and transferring second information indicating that the second electronic device is authenticated to a second authentication unit in the first electronic device, wherein the second authentication unit performs authentication through a second communication mode.

In accordance with another aspect of the present disclosure, a first electronic device that performs authentication is provided. The first electronic device includes a first authentication unit that performs authentication with respect to a second electronic device that requests authentication through a first communication mode and a second authentication unit that performs authentication through a second communication mode, wherein the first authentication unit transmits first information used for controlling the first electronic device to the second electronic device through the first communication mode when the second electronic device is authenticated, and transfers second information indicating that the second electronic device is authenticated to the second authentication unit.

In accordance with another aspect of the present disclosure, a method for performing authentication in a second electronic device is provided. The method includes requesting, by a first authentication unit, authentication with respect to the second electronic device through a first communication mode, receiving first information used for controlling a first electronic device from the first electronic device through the first communication mode when the second electronic device is authenticated, and transferring second information indicating that the second electronic device is authenticated to a second authentication unit in the second electronic device, wherein the second authentication unit requests authentication through a second communication mode.

In accordance with another aspect of the present disclosure, a second electronic device that performs authentication is provided. The second electronic device includes a first authentication unit that requests authentication with respect to the second electronic device through a first communication mode, and a second authentication unit that requests authentication through a second communication mode, wherein the first authentication unit receives first information used for controlling the first electronic device from the first electronic device through the first communication mode when the second electronic device is authenticated, and transfers second information indicating that the second electronic device is authenticated to the second authentication unit.

According to various embodiments of the present disclosure, an electronic device transfers the result of authentication through a first communication mode to a second authentication unit that performs authentication through a second communication mode. Thus, an independent authentication procedure for each communication mode that is used for performing connection with a vehicle may be linked with one another.

Through the above embodiments, the electronic device may not be required to perform a separate authentication procedure through the second communication mode, although the electronic device performs communication with the vehicle through the second communication mode, which is different from the first communication mode through which the authentication is performed. Also, the information indicating the authentication result through the first communication mode may not be checked without separate authority, so that a security problem may be prevented and avoid a level of security that deteriorates.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, like reference numerals will be understood to refer to like parts, components, and structures.

DETAILED DESCRIPTION

Figure 1:
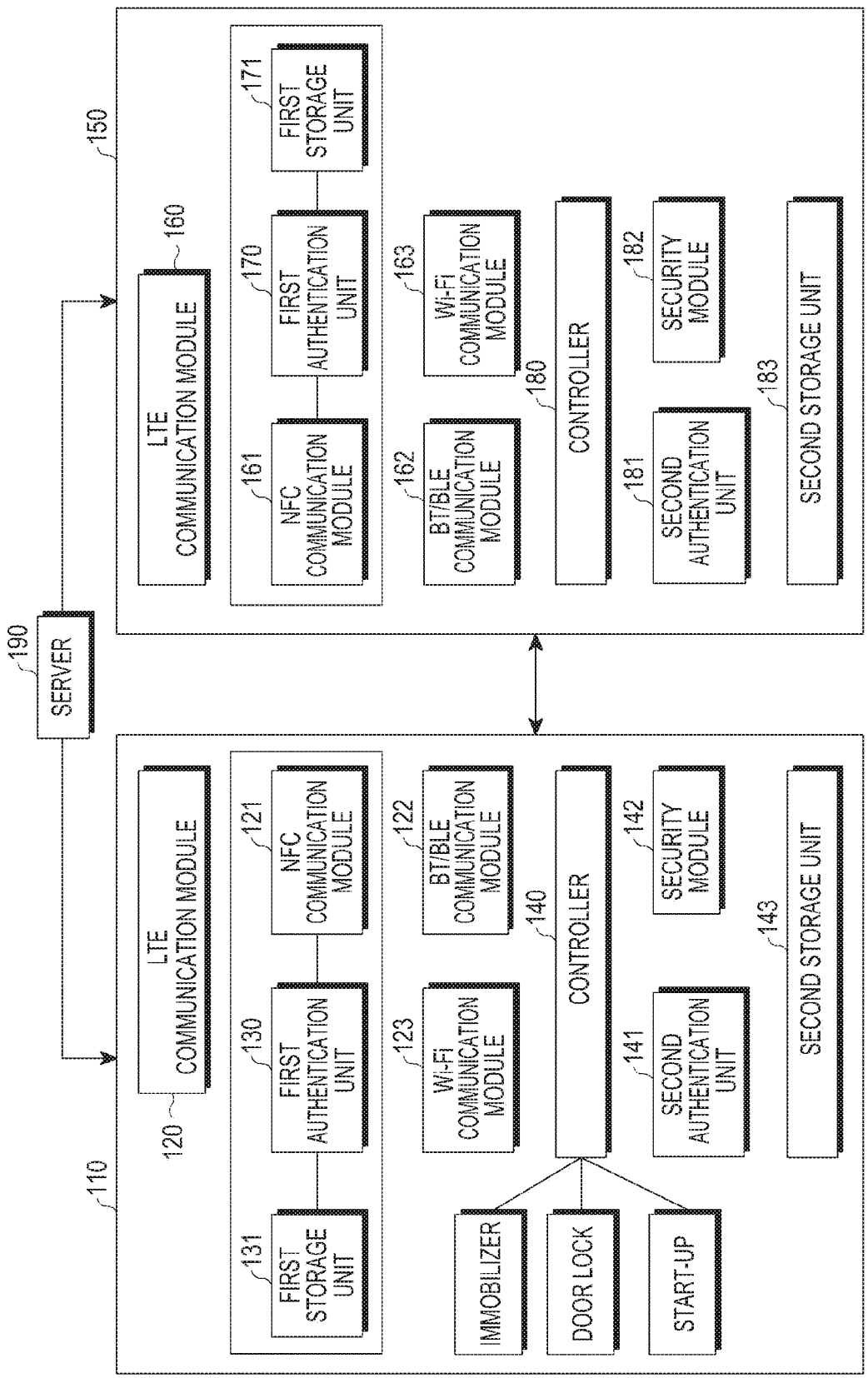
FIG. 1 is a block diagram of a first electronic device and a second electronic device according to various embodiments of the present disclosure.

The following description with reference to the accompanying drawings is provided to assist in a comprehensive understanding of various embodiments of the present disclosure as defined by the claims and their equivalents. It includes various specific details to assist in that understanding, but these are to be regarded as merely exemplary. Accordingly, those of ordinary skill in the art will recognize that various changes and modifications of the various embodiments described herein can be made without departing from the spirit and scope of the present disclosure. In addition, descriptions of well-known functions and constructions may be omitted for clarity and conciseness.

The terms and words used in the following description and claims are not limited to the bibliographical meanings, but are merely used to enable a clear and consistent understanding of the present disclosure. Accordingly, it should be apparent to those skilled in the art that the following description of various embodiments of the present disclosure is provided for illustration purpose only, and not for the purpose of limiting the present disclosure as defined by the appended claims and their equivalents.

It is to be understood that the singular forms "a", "an", and "the", include plural referents unless the context clearly dictates otherwise. Thus, for example, reference to "a component surface" includes reference to one or more of such surfaces.

As used herein, the expression "have", "may have", "include", or "may include" refers to the existence of a corresponding feature (e.g., numeral, function, operation, or constituent element such as component), and does not exclude one or more additional features.

In the present disclosure, the expression "A or B", "at least one of A or/and B", or "one or more of A or/and B" may include all possible combinations of the items listed. For example, the expression "A or B", "at least one of A and B", or "at least one of A or B" refers to all of (1) including at least one A, (2) including at least one B, or (3) including all of at least one A and at least one B.

The expression "a first", "a second", "the first", or "the second" used in various embodiments of the present disclosure may modify various components regardless of the order and/or the importance, but does not limit the corresponding components. For example, a first user device and a second user device indicate different user devices, but both of them are user devices. For further example, a first element may be termed a second element, and similarly, a second element may be termed a first element without departing from the scope of the present disclosure.

It should be understood that when an element (e.g., first element) is referred to as being (operatively or communicatively) "connected," or "coupled," to another element (e.g., second element), it may be directly connected or coupled directly to the other element or any other element (e.g., third element) may be interposed between them. In contrast, it may be understood that when an element (e.g., first element) is referred to as being "directly connected," or "directly coupled" to another element (e.g., second element), there are no elements (e.g., third element) interposed between them.

The expression "configured to" used in the present disclosure may be exchanged with, for example, "suitable for", "having the capacity to", "designed to", "adapted to", "made to", or "capable of" according to the situation. The term "configured to" may not necessarily imply "specifically designed to" in a hardware implementation. Alternatively, in some situations, the expression "device configured to" may mean that the device, together with other devices or components, "is able to". For example, the phrase "processor adapted (or configured) to perform A, B, and C" may mean a dedicated processor (e.g. embedded processor) only for performing the corresponding operations or a generic-purpose processor (e.g., central processing unit (CPU) or application processor (AP)) that can perform the corresponding operations by executing one or more software programs stored in a memory device.

Unless defined otherwise, all terms used herein, including technical and scientific terms, have the same meaning as those commonly understood by a person skilled in the art to which the present disclosure pertains. Such terms as those defined in a generally used dictionary may be interpreted to have meanings equal to the contextual meanings in the relevant field of art, and are not to be interpreted to have ideal or excessively formal meanings unless clearly defined in the present disclosure. In some cases, even the terms defined in the present disclosure should not be interpreted to exclude embodiments of the present disclosure.

An electronic device according to various embodiments of the present disclosure may include at least one of, for example, a smart phone, tablet personal computer (PC), mobile phone, video phone, electronic book reader (e-book reader), desktop PC, laptop PC, netbook computer, workstation, server, personal digital assistant (PDA), portable multimedia player (PMP), Moving Picture Experts Group (MPEG-1 or MPEG-2) audio layer-3 (MP3) player, mobile medical device, camera, and wearable device. According to various embodiments, the wearable device may include at least one of an accessory type (e.g., a watch, ring, bracelet, anklet, necklace, glasses, contact lens, or head-mounted device (HMD)), a fabric or clothing integrated type (e.g., electronic clothing), a body-mounted type (e.g., a skin pad or tattoo), and a bio-implantable type (e.g., an implantable circuit).

According to various embodiments, the electronic device may be a home appliance. The home appliance may include at least one of, for example, a television (TV), digital versatile disc (DVD) player, audio player, refrigerator, air conditioner, vacuum cleaner, oven, microwave oven, washing machine, air cleaner, set-top box, home automation control panel, security control panel, TV box (e.g., Samsung HomeSync™, Apple TV™, or Google TV™), game console (e.g., Xbox™ and PlayStation™), electronic dictionary, electronic key, camcorder, and electronic photo frame.

According to another embodiment, the electronic device may include at least one of various medical devices (e.g., various portable medical measuring devices (e.g., a blood glucose monitoring device, heart rate monitoring device, blood pressure measuring device, body temperature measuring device, and the like), magnetic resonance angiography (MRA), magnetic resonance imaging (MRI), computed tomography (CT) machine, and ultrasonic machine), a navigation device, global navigation satellite system (GNSS), event data recorder (EDR), flight data recorder (FDR), vehicle infotainment devices, electronic devices for a ship (e.g., a navigation device for a ship, and a gyro-compass) and avionics, security devices, an automotive head unit, robots for home or industry, automatic teller's machine (ATM) in banks, point of sales (POS) in a shop, or internet device of things (e.g., a light bulb, various sensors, electric or gas meters, sprinkler device, fire alarm, thermostat, streetlamp, toaster, sporting goods, hot water tank, heater, boiler, and the like).

According to various embodiments, the electronic device may include at least one of a part of furniture or a building/structure, an electronic board, electronic signature receiving device, projector, and various kinds of measuring instruments (e.g., a water meter, electric meter, gas meter, and radio wave meter). In various embodiments, the electronic device may be a combination of one or more of the aforementioned various devices. The electronic device according to various embodiments of the present disclosure may also be a flexible device. Further, the electronic device according to an embodiment of the present disclosure is not limited to the aforementioned devices, and may include new electronic devices according to the development of technology.

Hereinafter, an electronic device according to various embodiments will be described with reference to the accompanying drawings. As used herein, the term "user" may indicate a person who uses an electronic device or a device (e.g., an artificial intelligence electronic device) that uses an electronic device.

FIG. 1 is a block diagram of a first electronic device and a second electronic device according to various embodiments of the present disclosure.

Referring to FIG. 1, a first electronic device 110, a second electronic device 150, and a server 190 are illustrated in a network environment according to various embodiments of the present disclosure. The first electronic device 110 performs authentication in response to an authentication request, and performs an operation corresponding to a control signal received from an authenticated electronic device. The second electronic device 150 requests authentication to control the first electronic device 110. The server 190 may be connected with the first electronic device 110 and the second electronic device 150, and may perform authentication with respect to at least one the first electronic device 110 and the second electronic device 150. Also, the server 190 may include a group of one or more servers, at one or more locations.

Hereinafter, the first electronic device 110 indicates a vehicle or an electronic device (e.g., a car-kit) that is included in the vehicle to control the vehicle or assist in the control of the vehicle, and the second electronic device 150 indicates a smart phone, tablet PC, wearable device, or the like, to allow a user thereof to control the vehicle. However, this is merely an example for the purpose of description, and embodiments may not be limited thereto.

The first electronic device 110 may be a device that also performs authentication in response to an authentication request, and performs an operation corresponding to a control signal received from an authenticated electronic device. The second electronic device 150 may be a device that requests authentication to control the first electronic device 110, and controls the first electronic device 110 when it is authenticated.

Hereinafter, descriptions will be provided from the perspective of the configuration of the first electronic device 110. However, the second electronic device 150 may include components that are identical or substantially identical to those of the first electronic device 110, and at least one operation described in the first electronic device 110 may be performed in the second electronic device 150 and vice versa. Accordingly, descriptions associated with the duplicated parts of the second electronic device 150, which will be described in association with the first electronic device 110, will be omitted.

According to various embodiments of the present disclosure, the first electronic device 110 includes a communication module, a controller 140, a second authentication unit 141, a security module 142, and a second storage unit 143. The communication module may perform communication between the electronic device 110 and an external electronic device (e.g., the second electronic device 150 or the server 190). For example, the communication module may be connected to a network via wireless or wired communication so as to communicate with an external device.

The wireless communication may use at least one of, for example, long term evolution (LTE), LTE-advanced (LTE-A), code division multiple access (CDMA), wideband CDMA (WCDMA), universal mobile telecommunications system (UMTS), wireless broadband (WiBro), global system for mobile communications (GSM), and the like, as a cellular communication protocol.

In addition, the wireless communication may include, for example, short-range communication. The short-range communication may include, for example, at least one of WiFi, Bluetooth (BT), near field communication (NFC), GNSS, and the like. GNSS may include at least one of, for example, a global positioning system (GPS), global navigation satellite system (Glonass), beidou navigation satellite system (hereinafter referred to as "Beidou"), and european global satellite-based navigation system (Galileo), according to a use area, bandwidth, or the like. Hereinafter, "GPS" may be used interchangeably with "GNSS" in the present disclosure. The wired communication may include, for example, at least one of a universal serial bus (USB), high definition multimedia interface (HDMI), recommended standard 232 (RS-232), and plain old telephone service (POTS). The network may also include a communication network, for example, at least one of a computer network (e.g., a local area network (LAN) or wide area network (WAN)), Internet, and telephone network.

The communication module includes an LTE communication module 120, an NFC communication module 121, a BT/BT low energy (BLE) communication module 122, and a WiFi communication module 123. Each communication module may perform communication with the second electronic device 150 and the server 190 through a corresponding communication mode. However, this is merely an example for the purpose of description, and it should be apparent to those skilled in the art that various communication modules based on various communication modes may be included.

The NFC communication module 121 may be included in a hardware module that also includes a first authentication unit 130 and a first storage unit 131. The NFC communication module 121, the first authentication unit 130, and the first storage unit 131 may be disposed in the hardware module separately, unlike other components of the first electronic device 110 and thus, hardware-based security may be applied thereto. For example, the controller 140 or the second authentication unit 141 of the first electronic device 110 may not be aware of the result of the authentication performed by the first authentication unit 130, and may not be capable of directly using information stored in the first storage unit 131 without using the first authentication unit 130. As described above, the first authentication unit 130 and the first storage unit 131 are disposed in a separate hardware module and hardware-based security is applied thereto and thus, the security of the first authentication unit 130 and the first storage unit 131 is very strong.

Although FIG. 1 illustrates that only the first authentication unit 130 and the first storage unit 131 corresponding to the NFC communication module 121 are contained therein, this is merely an example for the purpose of description and embodiments may not be limited thereto. An authentication unit and a storage unit corresponding to each communication module may be separately included in the first electronic device 110.

The first electronic device 110 and the second electronic device 150 may include a bus (not illustrated), and the bus may include, for example, a circuit for connecting the component elements included in the first electronic device 110 and transferring communications (e.g., control messages and/or data) between the component elements included in the first electronic device 110.

The controller 140 may include one or more of a CPU, AP, and communication processor (CP). For example, the processor may perform operations or data processing related to the control and/or communication of at least one component of the first electronic device 110. The controller 140 may also perform authentication through the second authentication unit 141 in response to an authentication request through other communication modules excluding the NFC communication module 121 that is disposed in the hardware module including the first authentication unit 130 and the first storage unit 131. The controller 140 may also control a vehicle immobilizer, vehicle door-lock, vehicle start-up device, and the like, which are only a few of the possible mechanical components of the first electronic device 110.

The second storage unit 143 may include a volatile memory and/or a non-volatile memory. The second storage unit 143 may store, for example, algorithms, instructions and/or data relevant to at least one component of the first electronic device 110. According to an embodiment of the present disclosure, the second storage unit 143 may store software and/or programs. The programs may include, for example, a kernel, middleware, an application programming interface (API), and/or application programs (or "applications"). At least some of the kernel, middleware, and API may function as and be referred to as an operating system (OS).

The kernel may control or manage system resources (e.g., the bus, controller 140, or second storage unit 143) used for performing an operation or function implemented by the other programs (e.g., the middleware, API, or application programs). The kernel may also provide an interface through which the middleware, API, or application programs may access the individual components of the electronic device 110 to control or manage the system resources.

The middleware may serve as an intermediary so that an API or an application program communicates with a kernel and exchanges data.

Alternatively, the middleware may process one or more task requests received from an application program based on priorities. For example, the middleware may assign to at least one of the application programs, priorities for using the system resources (e.g., the bus, controller 140, second storage unit 143, or the like) of the electronic device 110. The middleware may perform scheduling or load balancing on the one or more task requests by processing the one or more task requests according to the priorities assigned thereto.

The API is an interface through which the applications control functions provided from the kernel or the middleware, and may include, for example, at least one interface or function (e.g., instruction) for file control, window control, image processing, problem control, or the like.

The first electronic device 110 may also include an input/output interface (not illustrated) and a display (not illustrated). The input/output interface, for example, may function as an interface that may transfer instructions or data input from a user or another external device to the other component(s) of the electronic device 110. The input/output interface may also output the instructions or data received from the other component(s) of the electronic device 110 to a user or another external device.

The display may include, for example, a liquid crystal display (LCD), a light-emitting diode (LED) display, an organic LED (OLED) display, a microelectromechanical systems (MEMS) display, and an electronic paper display. The display, for example, may display various types of contents (e.g., text, images, videos, icons, or symbols) to a user. The display may also include a touch screen, and may receive, for example, a touch, gesture, proximity, or hovering input by using an electronic pen or a body part of a user.

According to various embodiments of the present disclosure, some or all of the operations performed by the first electronic device 110 and the second electronic device 150 may be performed by another electronic device or by a plurality of electronic devices. According to an embodiment of the present disclosure, when the first electronic device 110 and the second electronic device 150 are to perform a function or service automatically or by request, the first electronic device 110 and the second electronic device 150 may request, from another electronic device, at least some function related thereto, instead of, or in addition to, performing the function or service by itself. The other electronic device may perform the requested function or additional functions, and may transfer the results to the first electronic device 110 and the second electronic device 150. The first electronic device 110 and the second electronic device 150 may provide the results as received or after additional processing, and provide the requested function or service based thereon. To this end, for example, cloud computing, distributed computing, or client-server computing technology may be used.

The controller 140 may process at least some of the information obtained from other components (e.g., at least one of the second authentication unit 141, security module 142, second storage unit 143, input/output interface, communication interface, and the like), and use the at least some of the information in various methods. For example, the controller 140 may control at least some functions of the first electronic device 110 so that the first electronic device 110 works together with another electronic device. The controller 140 may be integrated with the communication module. According to an embodiment of the present disclosure, at least one component of the controller 140 may be included in an external server, and the external server may support at least one operation implemented in the controller 140.

According to an embodiment of the present disclosure, the second storage unit 143 may include instructions that enable the controller 140 to operate. For example, the second storage unit 143 may include instructions that enable the controller 140 to control other components of the first electronic device 110, and to work together with another electronic device or an external server. Based on the instructions stored in the second storage unit 143, the controller 140 may control other components of the first electronic device 110, and may work together with another electronic device or an external server. Hereinafter, the operations of the first electronic device 110 will be described from the perspective of each of the components of the first electronic device 110. Instructions that enable an operation of each component to be performed may be included in the second storage unit 143.

According to various embodiments of the present disclosure, the first authentication unit 130 may perform authentication with respect to the second electronic device 150 that requests authentication through a first communication mode (e.g., NFC). However, this is merely for the purpose of description, and embodiments may not be limited thereto. Also, it should be apparent to those skilled in the art that various communication modes may be applicable. The first authentication unit 130 may receive an authentication request from the second electronic device 150 through the NFC communication module 121. The first authentication unit 130 may then perform authentication with respect to the second electronic device 150.

When the second electronic device 150 is authenticated, the first authentication unit 130 may transmit first information (e.g., credential information) used for controlling the first electronic device 110 to the second electronic device 150 through the first communication mode. For example, when the second electronic device 150 is authenticated, the first authentication unit 130 may transmit the first information stored in the first storage unit 131, to the second electronic device 150 through the NFC communication module 121.

The first information may be used for directly controlling the first electronic device 110 and thus, the security level of the first information may be set to be high. Therefore, authority is separately required to interpret or utilize the first information. When the first information is encrypted, a separate security key may also be required to ascertain the first information. At least one of an authority and a security key required for using the first information may also be stored in the first storage unit 131.

The first information is information used for directly controlling the first electronic device 110 and thus, the information may be available only to the second electronic device 150 that is authenticated by the first electronic device 110. Therefore, the first authentication unit 130 may further transfer at least one of the authority and the security key in association with the first information to the authenticated second electronic device 150. The first information and the authority and security key in association with the first information may be transmitted to the second electronic device 150 simultaneously or sequentially, periodically or aperiodically.

In an embodiment, the first information may be transmitted to the second electronic device 150 only when the second electronic device 150 is authenticated through the first communication mode. For example, the authority and the security key in association with the first information may be set to be unique to the first communication mode so that an authentication unit that performs authentication through another communication mode does not use or ascertain the first information. Further, in an embodiment, the authority and the security key in association with the first information may not be shared with an authentication unit (e.g., the second authentication unit 141) that performs authentication through another communication mode, excluding the first communication. The authority and the security key in association with the first information may be set to not allow the authentication unit (e.g., the second authentication unit 141) that performs authentication through another communication mode to read the authority and the security key. As described above, the authority and the security key in association with the first information is set to be unique to the first communication mode and thus, may not be used by the authentication unit (e.g., the second authentication unit 141) that performs authentication through another communication mode.

Further, in an embodiment, the first information may be one-time use information. For example, the first information may be information that is available from the time when the second electronic device 150 is authenticated by the first electronic device 110, to a time when a connection between the first electronic device 110 and the second electronic device 150 is terminated. The first information may be discarded after the connection between the first electronic device 110 and the second electronic device 150 is terminated. Accordingly, the second electronic device 150 may again perform a procedure of obtaining first information to control the first electronic device 110. In an embodiment, the second electronic device 150 may not discard the first information, but may perform a procedure that additionally obtains separate information corresponding to the first information from the first electronic device 110 to use the first information again.

In addition, the first information may include core information used for controlling a core component or system of the first electronic device 110, and subsidiary information used for controlling a subsidiary component or system of the first electronic device 110. For example, the core information may be authentication information used for controlling a component or system (e.g., a vehicle start-up device, vehicle immobilizer, vehicle accelerator, vehicle decelerator, vehicle breaking device, and the like) in association with the driving of the first electronic device 110. The subsidiary information may also be authentication information used for controlling a component or a system (e.g., a vehicle audio system, vehicle navigation system, vehicle window control device, vehicle air conditioner, vehicle heater, vehicle heat-ray sheet or air-blast sheet control device, and the like), which is not connected with the driving of the first electronic device 110.

The first authentication unit 130 may transmit both the core information and the subsidiary information included in the first information to the second electronic device 150, based on an authentication level of the second electronic device 150, and may transmit only the subsidiary information excluding the core information to the second electronic device 150. Further, in an embodiment, based on a request from a user or the like, only the core information may be transmitted to the second electronic device 150.

For example, when the security level of the second electronic device 150 is set to be higher than a security level that allows the reception of the core information or when authentication information corresponding to the security level that allows reception of the core information is obtained from the second electronic device 150 during the authentication process, the first authentication unit 130 may transmit both the core information and the subsidiary information to the second electronic device 150.

Conversely, when the security level of the second electronic device 150 is set to be lower than the security level that allows the reception of the core information or when authentication information corresponding to the security level that allows reception of the core information is not obtained from the second electronic device 150 during the authentication process, the first authentication unit 130 may transmit only the subsidiary information excluding the core information to the second electronic device 150. When only the subsidiary information is received, the second electronic device 150 may not control the core component or system of the first electronic device 110.

According to various embodiments of the present disclosure, the first authentication unit 130 may transfer second information indicating that the second electronic device 150 is authenticated to the second authentication unit 141. The second authentication unit 141 may perform authentication through a communication mode that is different from the first communication mode used by the first authentication unit 130. When an authentication unit for each communication mode is separately included in the first electronic device 110, each authentication unit may need to share an authentication result with one another so that each authentication unit does not redundantly perform an authentication procedure. When each authentication unit shares the authentication result, an authentication procedure may not be separately performed for each communication mode. For example, when the second authentication unit 141 obtains the second information, the second authentication unit 141 may determine that the second electronic device 150 is authenticated based on the second information, although a separate authentication procedure is not performed with the second electronic device 150 through second communication that is different from the first communication.

The second information is information indicating that the second electronic device 150 is authenticated, and may be used when an authentication unit of each communication mode determines whether to perform authentication with respect to the second electronic device 150. The second information may be included in the state information for operating the first electronic device 110.

In addition, when the first information is transmitted to the second electronic device 150, the second information may include state information indicating whether both the core information and the subsidiary information are transmitted, or whether only the subsidiary information is transmitted. Through the above, an authentication unit for each communication mode may recognize information that the second electronic device 150 receives, which is to be used for controlling the first electronic device 110. Accordingly, whether to process a control signal may be determined based on the second information.

In one example, the second electronic device 150 transmits to the first electronic device 110 through the second communication mode, a control signal for controlling a component or a system associated with the driving of the first electronic device 110 in a state in which the second electronic device 150 performs authentication through the first communication mode and receives only the subsidiary information. In this instance, the second authentication unit 141 ascertains the second information, and recognizes that the second electronic device 150 fails to obtain core information, which is authentication information used for controlling a component or a system that is associated with the driving of the first electronic device 110. Accordingly, the controller 140 determines that the second electronic device 150 is not authorized to control the component or system associated with driving of the first electronic device 110, and may not process a control signal received from the second electronic device 150.

The second information is not information that is directly used for controlling the first electronic device 110, unlike the first information and thus, the security level of the second information may be set to be lower than the first information. However, the second information includes information associated with the second electronic device 150, an authentication result in association with the second electronic device 150 and the like and thus, authority is separately required to interpret or use the second information. Further, when the second information is encrypted, a security key may also be separately required to ascertain or use the second information. However, the second information is information shared by each authentication unit and thus, authority and a security key associated with the second information may be set to be common for each authentication unit and may be shared by each authentication unit.

The first authentication unit 130 may further transfer at least one of the authority and the security key in association with the second information to the second authentication unit 141. The second authentication unit 141 may ascertain and use the second information using the obtained at least one of the authority and the security key in association with the second information. The second authentication unit 141 may recognize an authentication result with respect to the second electronic device 150 by ascertaining the second information.

However, the second authentication unit 141 and the second storage unit 143 may not be disposed in a separate hardware module, unlike the first authentication unit 130 and the first storage unit 131, but may be embodied through at least one processor included in the first electronic device 110. Accordingly, to maintain the security for the second information, the security module 142 is separately required.

The security module 142 may be a separate module that is embodied to process data of which the security level is set to be high. For example, the security module 142 may be a secure area that is virtually set through at least one processor that is included in the first electronic device 110. The security module 142 may be embodied through software, and the virtual secure area may be set to be distinguished from a normal area that processes a normal instruction or operation of the first electronic device 110. By partitioning a single processor, a first area may be set as a normal area and a second area may be set as a secure area. However, this is merely an example for the purpose of description, and embodiments may not be limited thereto. It should be apparent to those skilled in the art that various security technologies are applicable to distinctively process normal data and data in a high security level.

A virtual secure area may also be set in the second storage unit 143 in the first electronic device 110. Accordingly, the normal area may not access data stored in the virtual secure area of the second storage unit 143, and the data stored in the virtual secure area of the second storage unit 143 may be accessed through only the virtual secure area.

For example, in an embodiment, the second information may be ascertained or used through only the security module 142. The second authentication unit 141 may ascertain the second information using at least one of the authority and the security key in association with the second information in a virtual secure area that is set in advance, such as the security module 142. In addition, the second authentication unit 141 may receive the second information from the first authentication unit 130 through the security module 142. Further, the second information may be stored in the virtual secure area set in the second storage unit 143 to be distinguished from other data. Accordingly, without using the security module 142, access to the second information may not be allowed.

According to various embodiments of the present disclosure, the second authentication unit 141 may perform authentication with respect to the second electronic device 150 that requests authentication through a second communication mode. When the authentication of the second electronic device 150 is not performed by the first electronic device 110, the second electronic device 150 may request authentication from the first electronic device 110 through the second communication mode. The second authentication unit 141 may perform authentication with respect to the second electronic device 150 in response to the request.

When the second electronic device 150 is authenticated, the second authentication unit 141 may transmit to the second electronic device 150 through the second communication mode, third information (e.g., credential information) used for controlling the first electronic device 110. When the second electronic device 150 is authenticated, as the authentication is performed, the second authentication unit 141 may transmit to the second electronic device 150 through the second communication mode, the third information stored in the second storage unit 143.

The third information may be used for directly controlling the first electronic device 110, similar to the first information and thus, the security level of the third information may be set to be high. Therefore, authority is separately required to interpret or utilize the third information. When the third information is encrypted, a separate security key may be required to ascertain the third information. The authority and the security key required for using the third information may be stored in the second storage unit 143. The third information may be stored in a virtual secure area that is set in advance in the second storage unit 143 in the same manner as the second information.

However, as described above, the second authentication unit 141 and the second storage unit 143 may not be disposed in a separate hardware module, unlike the first authentication unit 130 and the first storage unit 131 and thus, the second authentication unit 141 and the second storage unit 143 may ascertain the third information through the security module 142 for security in the same manner as the second information.

The third information may also be transmitted to the second electronic device 150 only when the second electronic device 150 is authenticated through the second communication mode. For example, authority and a security key in association with the third information may be set to be unique to the second communication mode so that an authentication unit (e.g., the first authentication unit 130) that performs authentication through another communication mode does not use or ascertain the third information. In an embodiment, the authority and the security key in association with the third information may not be shared with an authentication unit (e.g., the first authentication unit 130) that performs authentication through another communication mode excluding the second communication mode. As described above, the authority and the security key in association with the third information is set to be unique to the second communication and thus, may not be used or interpreted by the authentication unit (e.g., the first authentication unit 130) that performs authentication through another communication mode.

The third information is used for controlling the first electronic device 110, similar to the first information, and may be information identical or linked to the first information. However, although the third information is identical or linked to the first information, the authority and the security key required for ascertaining or using the third information may not be identical to the authority and the security key required for ascertaining or using the first information.

The authority and security key required for each of the first information, second information, and third information may be generated respectively from the first authentication unit 130 and the second authentication unit 141 included in the first electronic device 110, or may be obtained from the external server 190. However, as described above, the first information is set to be unique to the first communication mode, and the third information is set to be unique to the second communication mode and thus, the information may not be shared between authentication units. Conversely, the second information may be commonly used for the first communication mode and the second communication mode and thus, may be shared between authentication units.

According to various embodiments of the present disclosure, to strengthen the security, the first information and the second information may be obtained from the separate external server 190 that performs authentication with respect to at least one electronic device. At least one of the authority and the security key in association with the first information, and at least one of the authority and the security key in association with the second information, may also be obtained from the server 190. In addition, for security, the authentication with respect to the second electronic device 150 which is performed by the first authentication unit 130 and the second authentication unit 141, may be performed in the server 190, and the server 190 may transmit an authentication result to the first authentication unit 130 and the second authentication unit 141.

According to various embodiments of the present disclosure, after the authentication with respect to the second electronic device 150 is performed through the first communication mode, the controller 140 may receive a control signal from the second electronic device 150 through the second communication mode. In this instance, the controller 140 may determine whether the second electronic device 150 is authenticated based on the second information that is transferred to the second authentication unit 141. For example, the controller 140 may determine that the second electronic device 150 is authenticated through the second authentication unit 141, or may directly determine that the second electronic device 150 is authenticated through the security module 142.

When it is determined that the second electronic device 150 is authenticated, the controller 140 may perform communication with the second electronic device 150 through the second communication mode. For example, the controller 140 may process a control signal that is received from the second electronic device 150, and may perform an operation corresponding to the control signal. As described above, although the control signal is received through the second communication mode, the controller 140 may not perform a separate authentication procedure through the second communication mode, and may determine whether to perform authentication with respect to the second electronic device 150 based on the second information.

According to various embodiments of the present disclosure, the controller 140 may receive a control signal from each of at least one authenticated electronic device. For example, when a plurality of electronic devices exist that are authenticated by the first electronic device 110, control signals may be received simultaneously from the plurality of electronic devices. In this instance, the controller 140 may determine a control signal to be preferentially processed among the received control signals based on a predetermined standard and the controller 140 may process the determined control signal.

The predetermined standard may include at least one of a distance between each of the at least one electronic device and the first electronic device, a security level of authentication performed between each of the at least one electronic device and the first electronic device, a communication mode used for authentication performed between each of the at least one electronic device and the first electronic device, a communication connection state of each of the at least one electronic device, and an order of a control signal received from each of the at least one electronic device.

A detailed method to determine the control signal to be preferentially processed among the received control signals based on the predetermined standard, will be described in greater detail.

Returning to FIG. 1, according to various embodiments of the present disclosure, the second electronic device 150 may include a communication module, a controller 180, a second authentication unit 181, a security module 182, and a second storage unit 183. The communication module may be connected to a network via wireless or wired communication so as to communicate with an external device.

The controller 180 may include one or more of a CPU, AP, and communication processor (CP). For example, the processor may perform operations or data processing related to the control and/or communication of at least one component of the second electronic device 150.

The communication module may include an LTE communication module 160, an NFC communication module 161, a BT/BLE communication module 162, and a WiFi communication module 163. Each communication module may perform communication with the first electronic device 110 and the server 190 through a corresponding communication mode. However, this is merely an example for the purpose of description, and it should be apparent to those skilled in the art that various communication modules based on various communication modes may be included.

Further, the NFC communication module 161 may be included in a hardware module that also includes a first authentication unit 170 and a first storage unit 171. The NFC communication module 161, the first authentication unit 170, and the first storage unit 171 may be disposed in the hardware module separately, unlike other components of the second electronic device 150 and thus, hardware-based security may be applied thereto. For example, the controller 180 or the second authentication unit 181 of the second electronic device 150 may not be aware of the result of the authentication performed by the first authentication unit 170, and may not be capable of using information stored in the first storage unit 171. As described above, the first authentication unit 170 and the first storage unit 171 are disposed in a separate hardware module and hardware-based security is applied thereto and thus, the security of the first authentication unit 170 and the first storage unit 171 is very strong.

Although FIG. 1 illustrates that only the NFC communication module 161 separately contains the first authentication unit 170 and the first storage unit 171, this is merely an example for the purpose of description and embodiments may not be limited thereto. An authentication unit and a storage unit may be separately contained for each communication module.

According to various embodiments of the present disclosure, the first authentication unit 170 may request authentication with respect to the second electronic device 150 through first communication mode (e.g., NFC). The first authentication unit 170 may request authentication with respect to the second electronic device 150 so as to control the first electronic device 110.

When the second electronic device 150 is authenticated, the first authentication unit 170 may receive from the first electronic device 110 through the first communication mode, first information (e.g., credential information) used for controlling the first electronic device 110. The first authentication unit 170 may store the received first information in the first storage unit 171. The first authentication unit 170 may also enable the controller 180 to use the first information when the controller 180 generates a control signal to control the first electronic device 110. Although the controller 180 does not directly use the first information that is stored in the first storage unit 171, the controller 180 may use the first information through the first authentication unit 170 when generating the control signal.

The first information may be used for directly controlling the first electronic device 110 and thus, the security level of the first information may be set to be high. Therefore, authority is separately required to interpret or utilize the first information. When the first information is encrypted, a separate security key may be required to ascertain the first information. Accordingly, the first authentication unit 170 may further receive at least one of the authority and the security key in association with the first information.

In addition, the first information may include core information used for controlling a core component or system of the first electronic device 110, and subsidiary information used for controlling a subsidiary component or system of the first electronic device 110. For example, the core information may be authentication information used for controlling a component or a system (e.g., a vehicle start-up device, vehicle immobilizer, vehicle accelerator, vehicle decelerator, vehicle breaking device, and the like) in association with the driving of the first electronic device 110. The subsidiary information may also be authentication information used for controlling a component or a system (e.g., a vehicle audio system, vehicle navigation system, vehicle window control device, vehicle air conditioner, vehicle heater, vehicle heat-ray sheet or air-blast sheet control device, and the like), which is not connected with the driving of the first electronic device 110.

The first authentication unit 170 may receive both the core information and the subsidiary information included in the first information from the first electronic device 110 based on an authentication level of the second electronic device 150, and may receive only the subsidiary information excluding the core information from the first electronic device 110. According to an embodiment, by request from a user or the like, only the core information may be received from the first electronic device 110.

For example, when the security level of the second electronic device 150 is set to be higher than a security level that allows the reception of the core information or when authentication information corresponding to the security level that allows the reception of the core information is received from the first electronic device 110 during the authentication process, the first authentication unit 170 may receive both the core information and the subsidiary information from the first electronic device 110.

Conversely, when the security level of the second electronic device 150 is set to be lower than the security level that allows reception of the core information or when authentication information corresponding to the security level that allows reception of the core information is not received from the first electronic device 110 during the authentication process, the first authentication unit 170 may receive only the subsidiary information excluding the core information from the first electronic device 110.

When only the subsidiary information is received, the second electronic device 150 may not control the core component or system of the first electronic device 110. That is, the second electronic device 150 may not be capable of generating a control signal for controlling the core component or system of the first electronic device 110. Also, although second electronic device 150 generates a control signal to control the core component or system of the first electronic device 110 and transmits the same to the first electronic device 110, the first electronic device 110 may not process the control signal.

The first authentication unit 170 may transfer second information indicating that the second electronic device is authenticated, to the second authentication unit 181. The second authentication unit 181 may request authentication through a communication mode that is different from the first communication mode used by the first authentication unit 170. When an authentication unit for each communication mode is separately included in the first electronic device 110, each authentication unit may need to share an authentication result with one another so that each authentication unit does not redundantly perform an authentication procedure. When each authentication unit shares the authentication result, an authentication procedure may not be separately performed for each communication mode. For example, when the second authentication unit 181 obtains the second information, the second authentication unit 181 may determine that the second electronic device 150 is authenticated based on the second information, although authentication is not requested to the first electronic device 110 through the second communication mode.

The second information is information indicating that the second electronic device 150 is authenticated, and may be used when an authentication unit for each communication mode determines whether to perform authentication with respect to the second electronic device 150. The second information may be included in the state information for driving the second electronic device 150.

In addition, when the first information is received by the first electronic device 110, the second information may include state information indicating whether both core information and subsidiary information are received, or only the subsidiary information is received. Through the above, the authentication unit corresponding to each communication mode may recognize information that the second device 150 receives, which is to be used for controlling the first electronic device 110. Accordingly, based on the second information, whether to generate or transmit the control signal may be determined.

In one example, the second electronic device 150 generates or transmits a control signal for controlling a component or a system associated with the driving of the first electronic device 110 in a state in which the second electronic device 150 performs authentication through the first communication mode and receives only the subsidiary information. In this instance, the second authentication unit 181 ascertains the second information and recognizes that the second electronic device 150 fails to obtain core information, which is authentication information used for controlling a component or a system that is associated with driving of the first electronic device 110. Accordingly, the controller 180 determines that the second electronic device 150 is not authorized to control the component or system associated with the driving of the first electronic device 110, and may not generate a control signal. When the control signal is generated, the controller 180 may perform a control so that the control signal is not transmitted to the first electronic device 110.

The second information includes information associated with the second electronic device 150, an authentication result in association with the second electronic device 150, and the like and thus, authority is separately required to use the second information. Accordingly, the first authentication unit 170 may further transfer at least one of the authority and the security key in association with the second information, to the second authentication unit 181. The second authentication unit 181 may ascertain the second information using the obtained at least one of the authority and the security key in association with the second information. The second authentication unit 181 may recognize an authentication result with respect to the second electronic device 150 by ascertaining the second information.

However, the second authentication unit 181 and the second storage unit 183 may not be disposed in a separate hardware module, unlike the first authentication unit 170 and the first storage unit 171, but may be embodied through at least one processor included in the second electronic device 150. Accordingly, to maintain the security with respect to the second information, the security module 182 is separately required.

The security module 182 may be a separate module that is embodied to process data of which the security level is set to be high. For example, the security module 182 may be included in a virtual secure area that is set through at least one processor included in the second electronic device 150, and the second information may be ascertained or used in only the virtual secure area. The second authentication unit 181 may ascertain or use the second information, using the authority and the security key in association with the second information, in the security module 182 and/or a security mode that is set in advance through the security module 182. In addition, the second authentication unit 181 may receive the second information from the first authentication unit 170 through the security module 182. The security module 182 may be embodied equivalently to the security module 142 of the first electronic device 110.

According to various embodiments of the present disclosure, to strengthen the security, the first information and the second information may be obtained from the separate external server 190 that performs authentication. At least one of the authority and the security key in association with the first information and at least one of the authority and the security key in association with the second information may also be obtained from the server 190. In addition, the first authentication unit 170 and the second authentication unit 181 may request authentication through the server 190, and the first authentication unit 170 and the second authentication unit 181 may receive an authentication result from the server 190.

According to various embodiments of the present disclosure, the controller 180 may control the first electronic device 110 by transmitting the generated control signal to the first electronic device 110. The control signal may be generated using the first information. The controller 180 may also perform communication with the first electronic device through the second communication mode in response to an event in which the second authentication unit 181 receives the second information. As described above, the controller 180 may determine whether the second electronic device 150 is authenticated based on the second information that is transferred to the second authentication unit 181. For example, the controller 180 may determine that the second electronic device 150 is authenticated through the second authentication unit 181, or may directly determine that the second electronic device 150 is authenticated through the security module 182.

When it is determined that the second electronic device 150 is authenticated, the controller 180 may perform communication with the second electronic device 150 through the second communication mode. For example, when it is determined that the second electronic device 150 is authenticated, the controller 180 may omit an operation of requesting authentication through the second communication mode when transmitting a control signal through the second communication mode.

Figure 2:
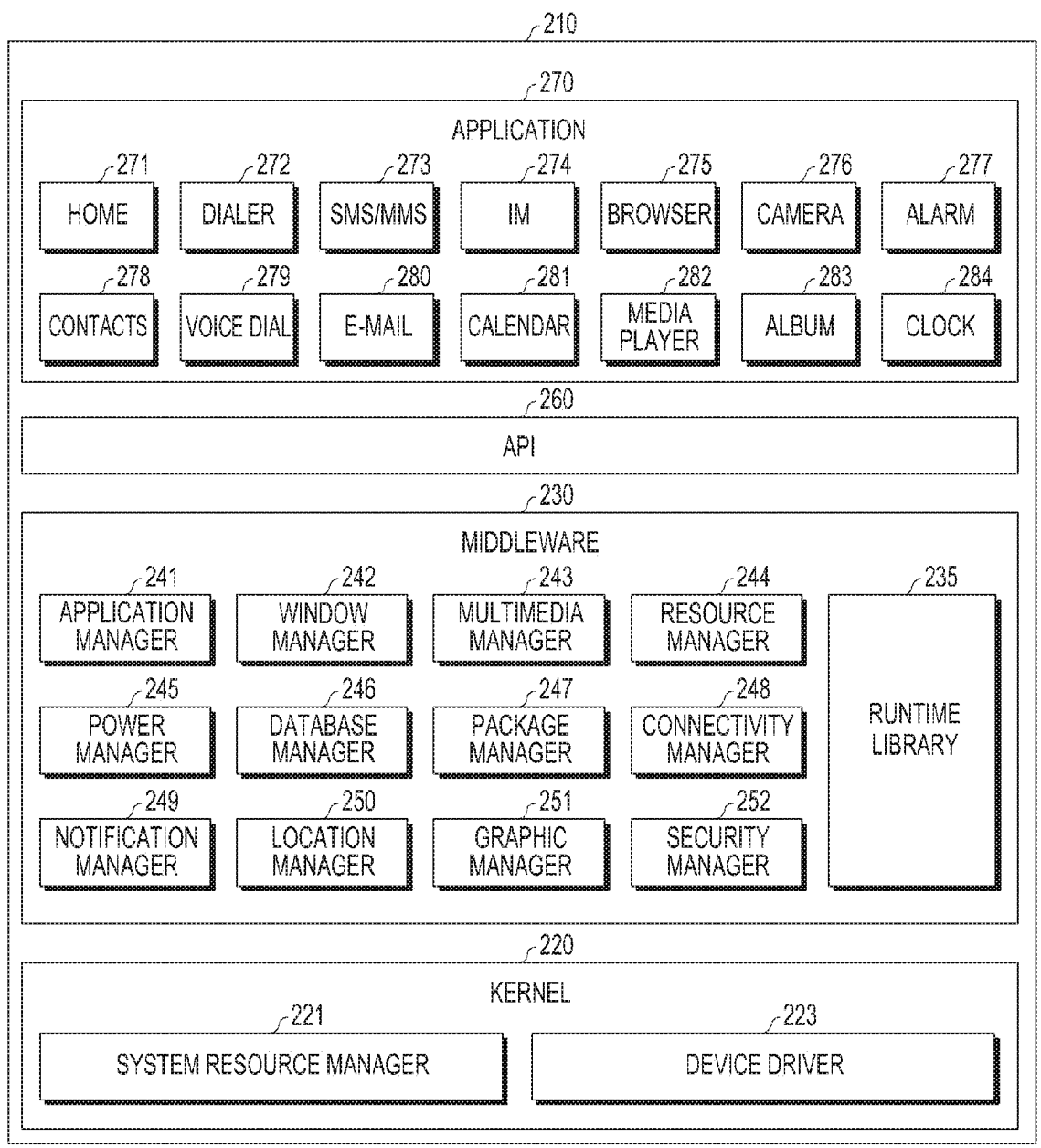
FIG. 2 is a block diagram of a program module according to various embodiments of the present disclosure.

FIG. 2 is a block diagram of a program module according to various embodiments of the present disclosure.

According to an embodiment of the present disclosure, a program module 210 may include an OS for controlling resources related to the electronic device (e.g., the first electronic device 110 and the second electronic device 150) and/or various applications performed in the OS. The OS may be, for example, Android, iOS, Windows, Symbian, Tizen, Bada, or the like.

Referring to FIG. 2, the program module 210 includes a kernel 220, middleware 230, an API 260, and/or an application 270. At least some of the program module 210 may be preloaded on an electronic device, or may be downloaded from an external electronic device (e.g., the server 190).

The kernel 220 may include, for example, a system resource manager 221 and/or a device driver 223. The system resource manager 221 may control, assign, or collect system resources. According to an embodiment of the present disclosure, the system resource manager 221 may include a process manager, memory manager, file system manager, or the like. The device driver 223 may include, for example, a display driver, camera driver, BT driver, shared memory driver, USB driver, keypad driver, Wi-Fi driver, audio driver, or inter-process communication (IPC) driver.

The middleware 230 may, for example, provide a function commonly required by the applications 270, or may provide various functions to the applications 270 through the API 260 so that the applications 270 can efficiently use limited system resources within the electronic device. According to an embodiment of the present disclosure, the middleware 230 may include at least one of a runtime library 235, an application manager 241, a window manager 242, a multimedia manager 243, a resource manager 244, a power manager 245, a database manager 246, a package manager 247, a connectivity manager 248, a notification manager 249, a location manager 250, a graphic manager 251, and a security manager 252.

The runtime library 235 may include, for example, a library module that a compiler uses in order to add new functions through a programming language while the applications 270 are executed. The runtime library 235 may perform input/output management, memory management, arithmetic functions, or the like.

The application manager 241 may, for example, manage a life cycle of at least one of the applications 270. The window manager 242 may manage graphical user interface (GUI) resources used on a screen. The multimedia manager 243 may identify formats required for the reproduction of various media files and encode or decode a media file using a codec suitable for a corresponding format. The resource manager 244 may manage resources of at least one of the applications 270, such as a source code, memory, storage space, and the like.

The power manager 245 may operate together with, for example, a basic input/output system (BIOS) to manage a battery or power, and may provide power information required for the operation of an electronic device. The database manager 246 may generate, search for, or change a database to be used in at least one of the applications 270. The package manager 247 may manage the installation or updating of an application distributed in the form of a package file.

The connectivity manager 248 may manage a wireless connection such as, for example, WiFi, BT, or the like. The notification manager 249 may display or report an event, such as an arrival message, appointment, proximity notification, and the like, in such a manner so as not to disturb a user. The location manager 250 may manage location information of an electronic device. The graphic manager 251 may manage a graphic effect to be provided to a user and a UI relating to the graphic effect. The security manager 252 may provide security functions required for system security, user authentication, or the like. According to an embodiment of the present disclosure, when an electronic device (e.g., the first electronic device 110 and the second electronic device 150) has a phone call function, the middleware 230 may further include a telephony manager for managing a voice call function or a video call function of the electronic device.

The middleware 230 may include a middleware module that forms combinations of various functions of the above described elements. The middleware 230 may provide a specialized module for each type of OS in order to provide a differentiated function. Furthermore, the middleware 230 may dynamically remove some of the existing components, or may add new components.

The API 260 is, for example, a set of API programming functions, and may be provided with a different configuration according to an OS. For example, in the case of Android or iOS, one API set may be provided for each platform, and in the case of Tizen, two or more API sets may be provided for each platform.

The applications 270 may include, for example, one or more applications that can provide functions, such as a home 271, dialer 272, short message service (SMS)/multimedia message service (MMS) 273, instant message (IM) 274, browser 275, camera 276, alarm 277, contacts 278, voice dial 279, email 280, calendar 281, media player 282, album 283, clock 284, health care (e.g., measure exercise quantity or blood sugar), or environment information (e.g., atmospheric pressure, humidity, or temperature information).

According to an embodiment of the present disclosure, the applications 270 may include an application (hereinafter, referred to as an "information exchange application" for convenience of description) that supports exchanging information between the electronic device (e.g., the first electronic device 110 and the second electronic device 150) and an external electronic device. The application associated with exchanging information may include, for example, a notification relay application for notifying an external electronic device of certain information or a device management application for managing an external electronic device.

The notification relay application may include a function of transferring, to an external electronic device, notification information generated from other applications of an electronic device (e.g., an SMS/MMS application, e-mail application, health management application, or environmental information application). Further, the notification relay application may receive notification information from, for example, an external electronic device, and may provide the received notification information to a user.

The device management application may manage (e.g., install, delete, or update) at least one function of an external electronic device communicating with an electronic device (e.g., a function of turning on/off the external electronic device itself or some components, or a function of adjusting luminance or resolution of the display), applications operating in the external electronic device, or services provided by the external electronic device (e.g., a call service, message service, or the like).

According to an embodiment of the present disclosure, the applications 270 may include applications (e.g., a health care application of a mobile medical appliance or the like) designated according to attributes of an external electronic device. According to an embodiment of the present disclosure, the application 270 may include an application received from an external electronic device. According to an embodiment of the present disclosure, the applications 270 may include a preloaded application or a third party application, which can be downloaded from the server. Names of the elements of the program module 210 according to the above-described embodiments of the present disclosure may change depending on the type of OS.

According to various embodiments of the present disclosure, at least some of the program module 210 may be implemented in software, firmware, hardware, or a combination of two or more thereof. At least some of the program module 210 may be implemented (e.g., performed) by, for example, the processor(s) of controllers 140 and 180. At least a part of the program module 210 may include, for example, a module, program, routine, set of instructions, and/or process for performing one or more functions described herein.

Figure 3:
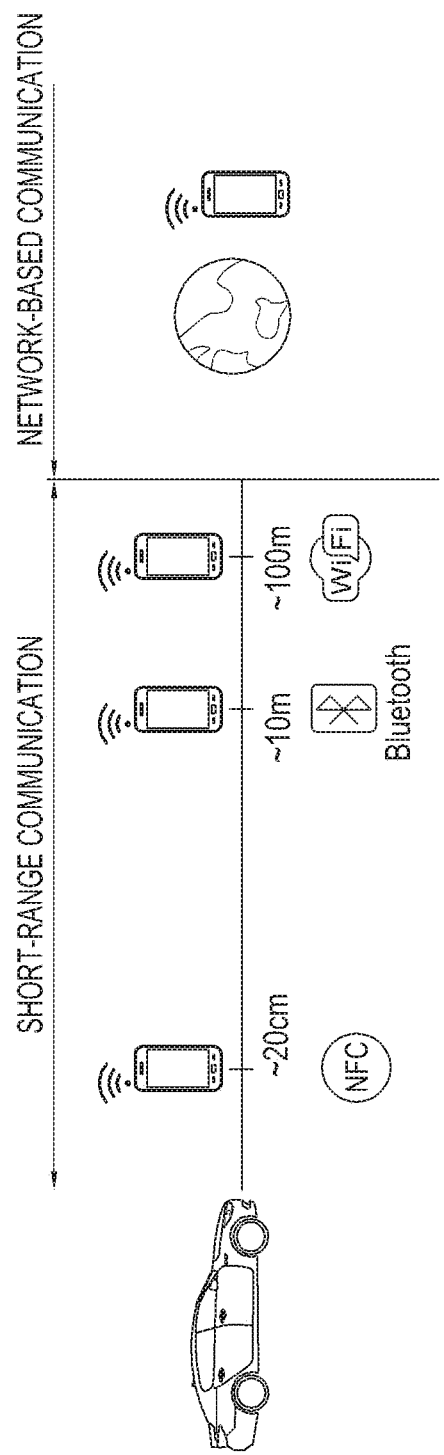
FIG. 3 illustrates a communication mode that is available based on a distance between a first electronic device and a second electronic device according to various embodiments of the present disclosure.

FIG. 3 illustrates a communication mode that is available based on a distance between a first electronic device and a second electronic device according to various embodiments of the present disclosure.

Referring to FIG. 3, in an example where a vehicle is a first electronic device and a smart phone is a second electronic device, various communication modes may be used based on the distance between the vehicle and the smart phone, and a coverage associated with a communication mode.

For example, when the distance between the vehicle and the smart phone is close (e.g., within 20 cm), an NFC mode may be used. When a user of the smart phone gets in the vehicle, or when the user is close to the vehicle, the smart phone and the vehicle may perform authentication through NFC and transmit/receive a control signal.

When the distance between the vehicle and the smart phone increases, a short-range communication mode, such as BT (e.g., within 10 m) or WiFi (e.g., within 100 m), may be applied. The vehicle and the smart phone may perform communication by selecting one of the short-range communication modes based on a predetermined standard.

In addition, when the distance between the vehicle and the smart phone exceeds the distance in which the short-range communication mode is available, the vehicle and the smart phone perform network-based communication. Communication may also be performed between the vehicle and the smart phone through other communication modes in addition to the above described communication modes. It should be apparent to those skilled in the art that various communication modes can be applied based on a coverage associated with each communication mode and the distance between the vehicle and the smart phone.

As described above, the vehicle and the smart phone may perform communication through various communication modes. According to the related art, a separate authentication unit performs an authentication procedure based on each communication mode, and an authentication result of each authentication unit is not shared with one another and thus, an authentication procedure is repeatedly performed based on a communication mode, which is a drawback typically associated with the related art.

The first electronic device 110 and the second electronic device 150 according to various embodiments of the present disclosure, share through each authentication unit, an authentication result performed by a separate authentication unit, thereby preventing an authentication procedure from being repeatedly performed. In addition, the first electronic device 110 and the second electronic device 150 do not merely share the authentication result, but set the shared authentication result to be ascertained through at least one of a common authority and a common security key that are available in each authentication unit, thereby preventing the security level from being deteriorated.

Figure 4:
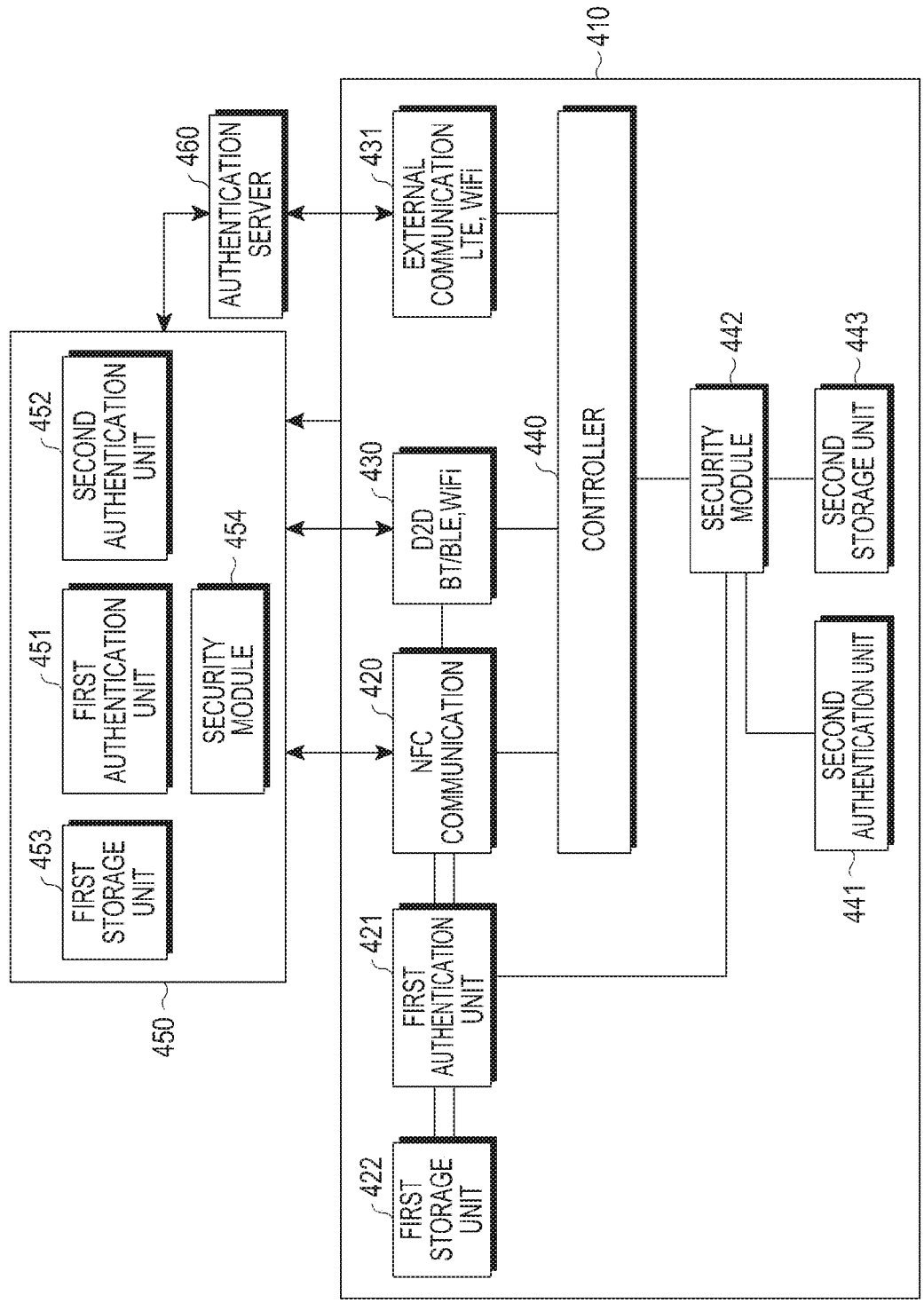
FIG. 4 illustrates various authentication methods performed between a block diagram of a first electronic device and a block diagram of a second electronic device according to various embodiments of the present disclosure.

FIG. 4 illustrates various authentication methods performed between a block diagram of a first electronic device and a block diagram of a second electronic device according to various embodiments of the present disclosure.

According to various embodiments of the present disclosure, when a second electronic device 450 is authenticated by a first electronic device 410 irrespective of a communication mode, the second electronic device 450 may obtain control of the first electronic device 410.

Referring to FIG. 4, the first electronic device 410 and the second electronic device 450 may be connected in a device-to-device (D2D) manner, or may be connected via a server over a network. For example, the first electronic device 410 and the second electronic device 450 may be connected in a D2D manner through NFC, or the first electronic device 410 and the second electronic device 450 may be connected in a D2D manner through short-range communication (e.g., BT or WiFi) excluding NFC provided by module 430. The first electronic device 410 and the second electronic device 450 may also be connected via an external server over WiFi or a network provided by module 431.

Based on each connection mode, different authentication modes may be required between the first electronic device 410 and the second electronic device 450. For example, when a connection is established through NFC, authentication may be performed between a first authentication unit 421 of the first electronic device 410 and a first authentication unit 451 of the second electronic device 450. The first authentication unit 421 of the first electronic device 410 and the first authentication unit 451 of the second electronic device 450 may be authentication units that perform authentication through NFC.

When a connection is established through short-range communication excluding NFC, authentication may be performed between a second authentication unit 441 of the first electronic device 410 and a second authentication unit 452 of the second electronic device 450. The second authentication unit 441 of the first electronic device 410 and the second authentication unit 452 of the second electronic device 450 may be authentication units that perform authentication through the short-range communication excluding NFC.

When a connection is established via an external server, authentication may be performed between the external authentication server 460 and the second authentication unit 441 of the first electronic device 410 and the second authentication unit 452 of the second electronic device 450.

As described above, an authentication unit that performs authentication may be changed based on a communication mode. However, when any authentication unit performs authentication with respect to the second electronic device 450, and the result of the authentication with respect to the second electronic device 450 is shared by the authentication unit, authentication may be prevented from being performed repeatedly for each communication mode.

Hereinafter, descriptions will be provided in a case where authentication is performed between the first authentication unit 421 of the first electronic device 410 and the first authentication unit 451 of the second electronic device 450.

The first authentication unit 451 of the second electronic device 450 may request, through NFC, the first electronic device 410 to perform authentication with respect to the second electronic device 450. The first electronic device 410 receives the request through an NFC communication module 420, and transfers the request to the first authentication unit 421. The first authentication unit 421 may perform authentication with respect to the second electronic device 450 in response to the request.

When the second electronic device 450 is authenticated, the first authentication unit 421 may transmit to the second electronic device 450, first information stored in a first storage unit 422. The first information may be authentication information used for controlling the first electronic device 410. The first authentication unit 421 may further transfer at least one of an authority and a security key in association with the first information to the second electronic device 450.

The first authentication unit 421 may transfer second information indicating that the second electronic device 450 is authenticated to the second authentication unit 441. In addition, the first authentication unit 421 may further transfer at least one of an authority and a security key in association with the second information, to the second authentication unit 441.

In an embodiment, the first authentication unit 421 may not transfer the second information via a controller 440, but may transfer the second information through a separate security module 442 that is connected with the second authentication unit 441. The security module 442 may be an area that is virtually set in at least one processor in the first electronic device 410. The second information may also be stored in a second storage unit 443 through the security module 442. As described above, the first authentication unit 421 may transfer the second information to the second authentication unit 441 through the separate security module 442 without passing through the controller 440, thereby maintaining security.

The first authentication unit 451 of the second electronic device 450 may receive the first information and may store the first information in a first storage unit 453. The first authentication unit 451 may also transfer third information indicating that the second electronic device 450 is authenticated to the second authentication unit 452 of the second electronic device 450. The third information may be transferred through a separate security module 454, without passing through a controller (not illustrated) of the second electronic device 450, in the same manner as the second information. As described above, the second electronic device 450 transfers the third information to the second authentication unit 452 through the security module 454, thereby maintaining security.

The second information is transferred to the second authentication unit 441 of the first electronic device 410, and the third information is transferred to the second authentication unit 452 of the second electronic device 450, respectively, and thus, an authentication result is shared. Through the above, when the second electronic device 450 performs communication with the first electronic device 410 through BT or WiFi, the second electronic device 450 may not request separate authentication. When the first electronic device 410 performs communication with the second electronic device 450 through BT or WiFi, the first electronic device 410 may process a signal received from the second electronic device 450, although separate authentication is not performed.

In the above descriptions, although the case in which authentication is performed through the first communication mode has been described, this is merely an example for the purpose of description and embodiments may not be limited thereto. Even when authentication is performed through the second communication mode, an authentication result of each authentication unit is equally shared with one another. For example, when the second authentication unit 441 performs authentication with respect to the second electronic device 450 through the second communication mode, the second authentication unit 441 may transfer the second information to the first authentication unit 421. In this instance, information transferred to the second electronic device 450 as the authentication is performed may be fourth information that is set to be unique to the second communication mode. The fourth information may be authentication information that is used for controlling the first electronic device 410, like the first information. The fourth information may be set to be unique to the second communication mode (e.g., BT or WiFi), unlike the first information.

According to various embodiments of the present disclosure, the second authentication unit 441 may consign the authentication with respect to the second electronic device 450 to the first authentication unit 421. That is, when a request for authentication with respect to the second electronic device 450 is received through the second communication mode, the second authentication unit 441 may transfer the request to the first authentication unit 421. Accordingly, the first authentication unit 421 may perform authentication with respect to the second electronic device 450 on behalf of the second authentication unit 441. In this instance, the second authentication unit 441 may not be capable of reading information associated with authentication, and may only transfer the information to the first authentication unit 421 or the second electronic device 450.

Figure 5:
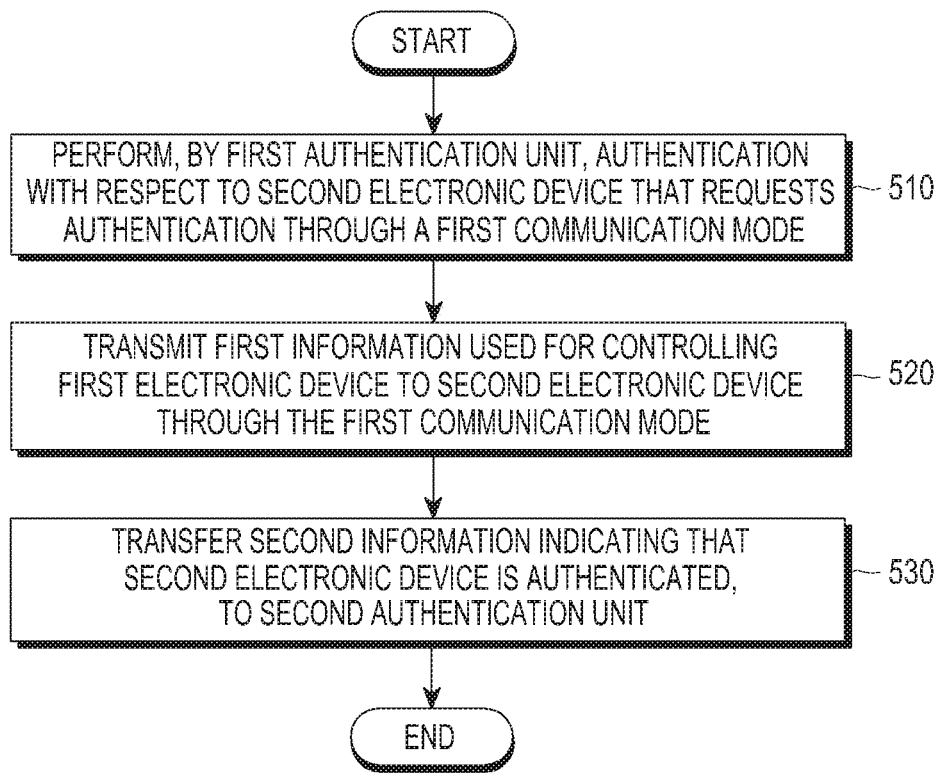
FIG. 5 is a flowchart illustrating an authentication method performed by a first electronic device according to various embodiments of the present disclosure.

FIG. 5 is a flowchart illustrating an authentication method performed by a first electronic device according to various embodiments of the present disclosure.

Referring to FIG. 5, in operation 510, a first electronic device may perform authentication with respect to a second electronic device that requests authentication through the first communication mode. A first authentication unit of the first electronic device may receive a request for authentication from the second electronic device through the first communication mode, and may perform authentication with respect to the second electronic device.

In operation 520, when the second electronic device is authenticated, the first electronic device may transmit to the second electronic device, first information used for controlling the first electronic device through the first communication mode.

The first information may be used for directly controlling the first electronic device 110 and thus, the security level of the first information may be set to be high. Therefore, authority is separately required to use the first information. When the first information is encrypted, a separate security key may also be required to ascertain the first information. Accordingly, the first electronic device may further transfer to the second electronic device at least one of an authority and a security key in association with the first information.

In operation 530, the first authentication unit of the first electronic device may transfer second information indicating that the second electronic device is authenticated to a second authentication unit that performs authentication through the second communication mode. When an authentication unit for each communication mode is separately included in the first electronic device, each authentication unit may need to share an authentication result with one another so that each authentication unit does not redundantly perform an authentication procedure. When each authentication unit shares the authentication result, an authentication procedure may not be separately performed for each communication mode.

The second information is not information that is directly used for controlling the first electronic device, unlike the first information and thus, the security level of the second information may be set to be lower than the first information. However, the second information includes information associated with the second electronic device, an authentication result with respect to the second electronic device, and the like, and thus, authority is separately required to use the second information. Accordingly, the first authentication unit may further transfer an authority or a security key in association with the second information to the second authentication unit, and the second authentication unit may ascertain the second information using the authority or the security key in association with the second information.

Figure 6:
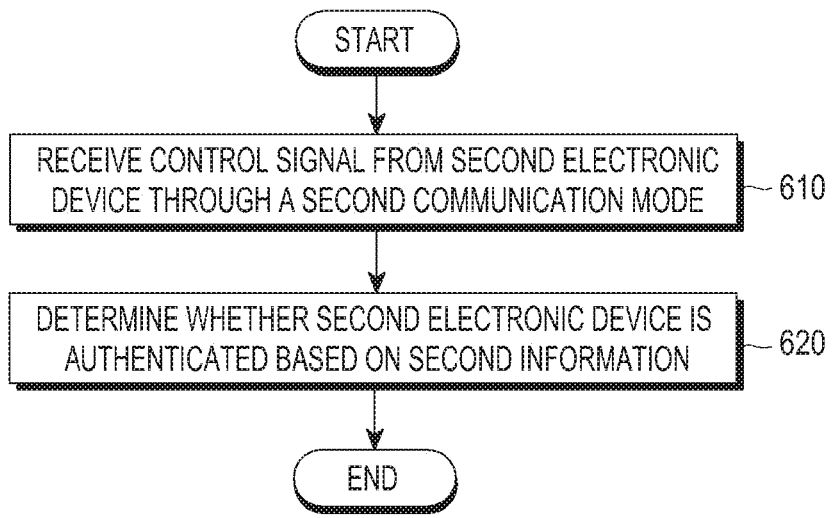
FIG. 6 is a flowchart illustrating a method for a first electronic device to process a control signal received through a second communication mode according to various embodiments of the present disclosure.

FIG. 6 is a flowchart illustrating a method for a first electronic device to process a control signal received through a second communication according to various embodiments of the present disclosure.

Referring to FIG. 6, in operation 610, after a second electronic device is authenticated through the first communication mode, a first electronic device may receive a control signal from the second electronic device through the second communication mode. After the second electronic device is authenticated, the second electronic device may transmit a control signal for controlling the first electronic device. When the authentication is performed by the first electronic device, the second electronic device may transmit the control signal to the first electronic device irrespective of the communication mode.

In operation 620, the first electronic device determines whether the second electronic device is authenticated based on the second information indicating that the second electronic device is authenticated. When it is determined that the second electronic device is authenticated, the first electronic device may perform communication with the second electronic device through the second communication mode.

For example, the first electronic device may process a control signal that is received from the second electronic device, and may perform an operation corresponding to the control signal. As described above, although the control signal is received through the second communication mode, which is different from the first communication mode through which authentication is performed, the first electronic device may not perform a separate authentication procedure through the second communication mode, and may determine whether to perform authentication with respect to the second electronic device based on the second information.

Figure 7:
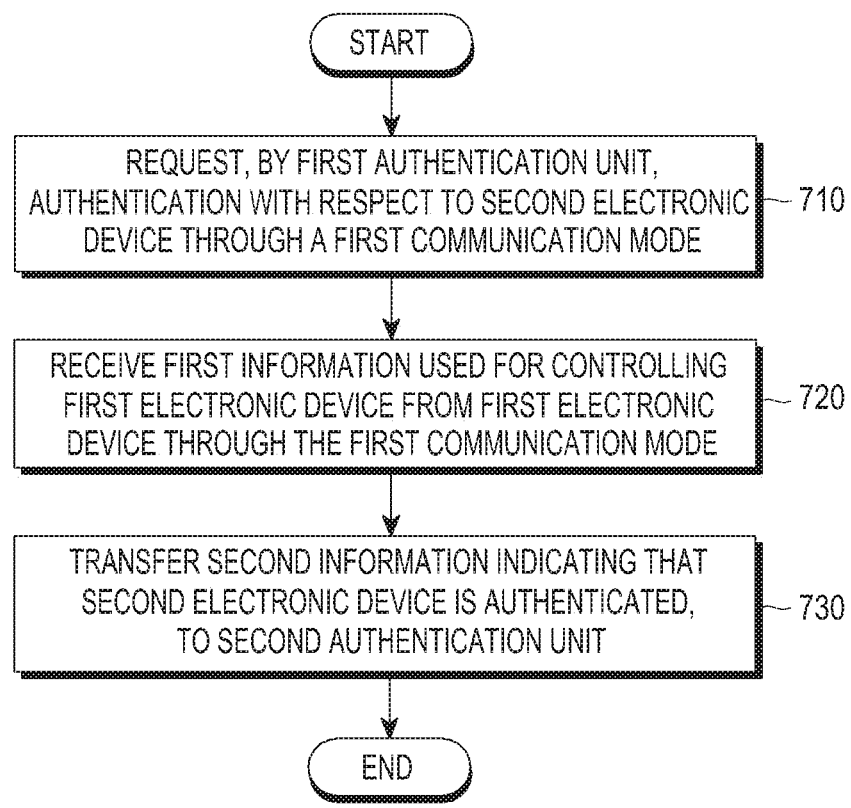
FIG. 7 is a flowchart illustrating an authentication method performed by a second electronic device according to various embodiments of the present disclosure.

FIG. 7 is a flowchart illustrating an authentication method performed by a second electronic device according to various embodiments of the present disclosure.

Referring to FIG. 7, in operation 710, a first authentication unit of the second electronic device may request authentication with respect to a second electronic device through the first communication mode. The first authentication unit may request authentication with respect to the second electronic device so as to control a first electronic device.

In operation 720, when the second electronic device is authenticated, the first authentication unit may receive first information used for controlling the first electronic device from the first electronic device through the first communication mode.

The first information may be used for directly controlling the first electronic device and thus, the security level of the first information may be set to be high. Therefore, authority is separately required to use the first information. When the first information is encrypted, a separate security key may also be required to ascertain the first information. Accordingly, the first authentication unit may further receive at least one of an authority and a security key in association with the first information.

In operation 730, the first authentication unit of the second electronic device may transfer second information indicating that the second electronic device is authenticated to a second authentication unit of the second electronic device. When an authentication unit for each communication mode is separately included in the second electronic device, each authentication unit may need to share an authentication result with one another so that each authentication unit does not redundantly perform an authentication procedure. When each authentication unit shares the authentication result, an authentication procedure may not be separately performed for each communication mode.

The second information includes information associated with the second electronic device, an authentication result in association with the second electronic device, and the like, and thus, authority is separately required to use the second information. Accordingly, the first authentication unit may further transfer to the second authentication unit at least one of an authority and a security key in association with the second information.

Figure 8:
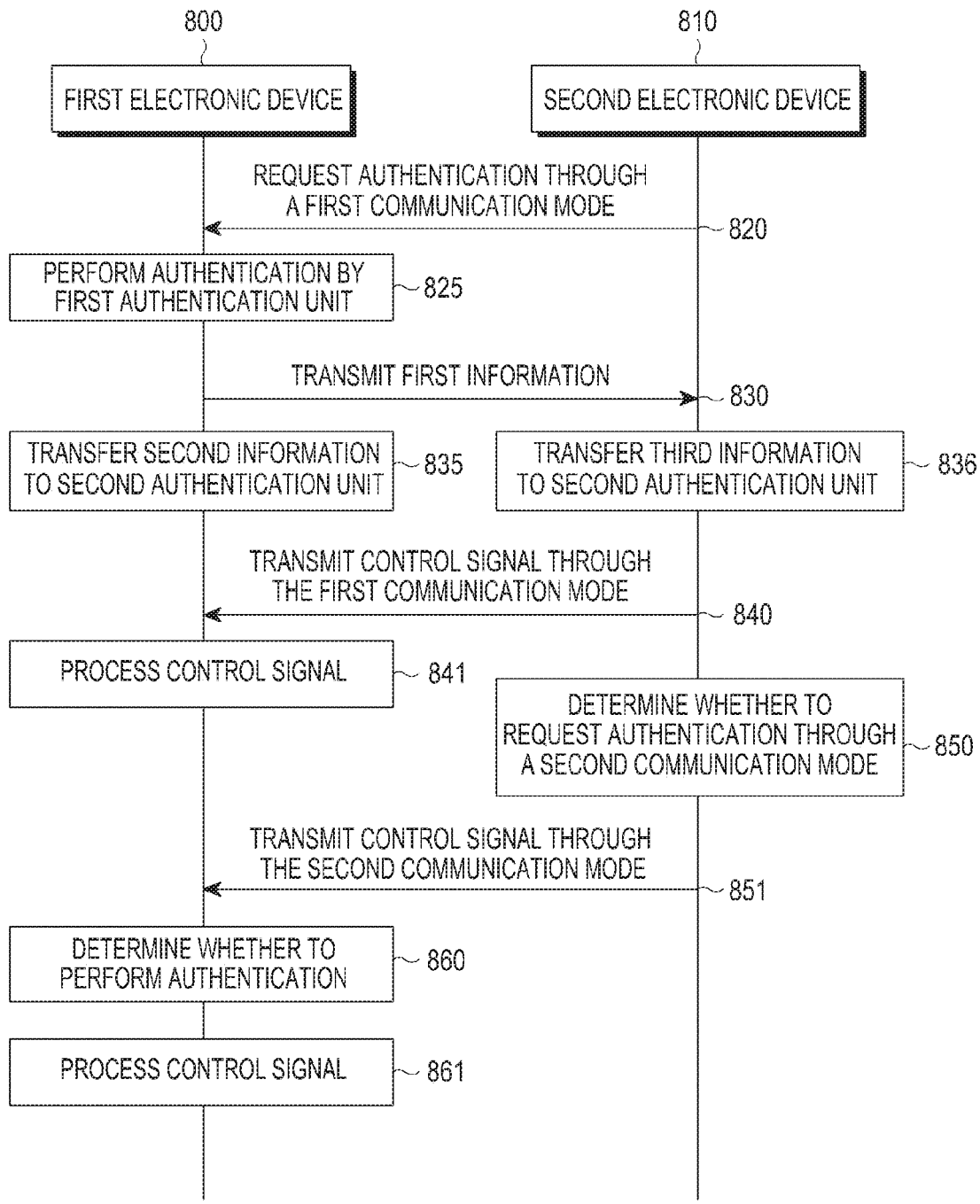
FIG. 8 is a flowchart illustrating an authentication method performed between a first electronic device and a second electronic device according to various embodiments of the present disclosure.

FIG. 8 is a flowchart illustrating an authentication method performed between a first electronic device and a second electronic device, and a control signal processing method, according to various embodiments of the present disclosure.

Referring to FIG. 8, a method for performing authentication between a first electronic device 800 and a second electronic device 810, and a method of processing a control signal after the authentication, will be described.

In operation 820, the second electronic device 810 requests, through the first communication mode, the first electronic device 800 to perform authentication with respect to the second electronic device 810. The second electronic device 810 needs to be authenticated by the first electronic device 800 before transmitting a control signal to control the first electronic device 800. Accordingly, the second electronic device 810 transmits a request for authentication to the first electronic device 800.

In operation 825, a first authentication unit of the first electronic device 800 may perform authentication with respect to the second electronic device 810. The first authentication unit of the first electronic device may receive a request for authentication from the second electronic device through the first communication mode, and may perform authentication with respect to the second electronic device.

In operation 830, when the second electronic device 810 is authenticated, the first authentication of the first electronic device 800 may transmit first information used for controlling the first electronic device 800 to the second electronic device 810 through the first communication mode. The first authentication unit of the first electronic device 800 may further transfer at least one of an authority and a security key in association with the first information to the second electronic device 810.

In operation 835, the first authentication unit of the first electronic device 800 may transfer second information indicating that the second electronic device is authenticated to a second authentication unit of the first electronic device 800, which performs authentication through the second communication mode. When an authentication unit for each communication mode is separately included in the first electronic device, each authentication unit may need to share an authentication result with one another so that each authentication unit does not redundantly perform an authentication procedure. The first authentication unit may further transfer an authority or a security key in association with the second information to the second authentication unit, and the second authentication unit may ascertain the second information using the authority or the security key in association with the second information.

In operation 836, a first authentication unit of the second electronic device 810 may transfer third information indicating that the second electronic device 810 is authenticated to a second authentication unit of the second electronic device 810.

The third information includes information associated with the second electronic device, an authentication result in association with the second electronic device, and the like, and thus, authority is separately required to use the third information. Accordingly, the first authentication unit of the second electronic device may further transfer to the second authentication unit of the second electronic device at least one of an authority and a security key in association with the third information.

In operation 840, the second electronic device 810 transmits a control signal to the first electronic device 800 through the first communication mode. In operation 841, the first electronic device 800 may process the received control signal. For example, the first electronic device 800 may perform an operation corresponding to the received control signal.

In operation 850, the second electronic device 810 may determine whether to request authentication through the second communication mode. When the second electronic device 810 transmits a control signal to the first electronic device 800 through the second communication mode, which is different from the first communication mode through which authentication is performed, the second electronic device 810 may determine whether to request authentication through the second communication mode. For example, the second electronic device 810 may determine whether to request authentication based on third information that is transferred to the second authentication unit. The second electronic device 810 may determine, from the third information, that the second electronic device 810 is authenticated by the first electronic device 800 using at least one of an authority and a security key associated with the second information.

In operation 851, the second electronic device 810 transmits a control signal to the first electronic device 800 through the second communication mode. The second electronic device 810 determines that the second electronic device 810 is authenticated by the first electronic device 800 based on the third information and accordingly, may not request authentication through the second communication mode.

In operation 860, the first electronic device 800 receives a control signal through the second communication mode, and determines whether to perform authentication with respect to the second electronic device 810 before processing the control signal. The first electronic device 800 determines that the second electronic device 810 is authenticated based on the second information transferred to the second authentication unit.

In operation 861, when it is determined that the second electronic device 810 is authenticated, the first electronic device 800 processes the received control signal.

Figure 9:
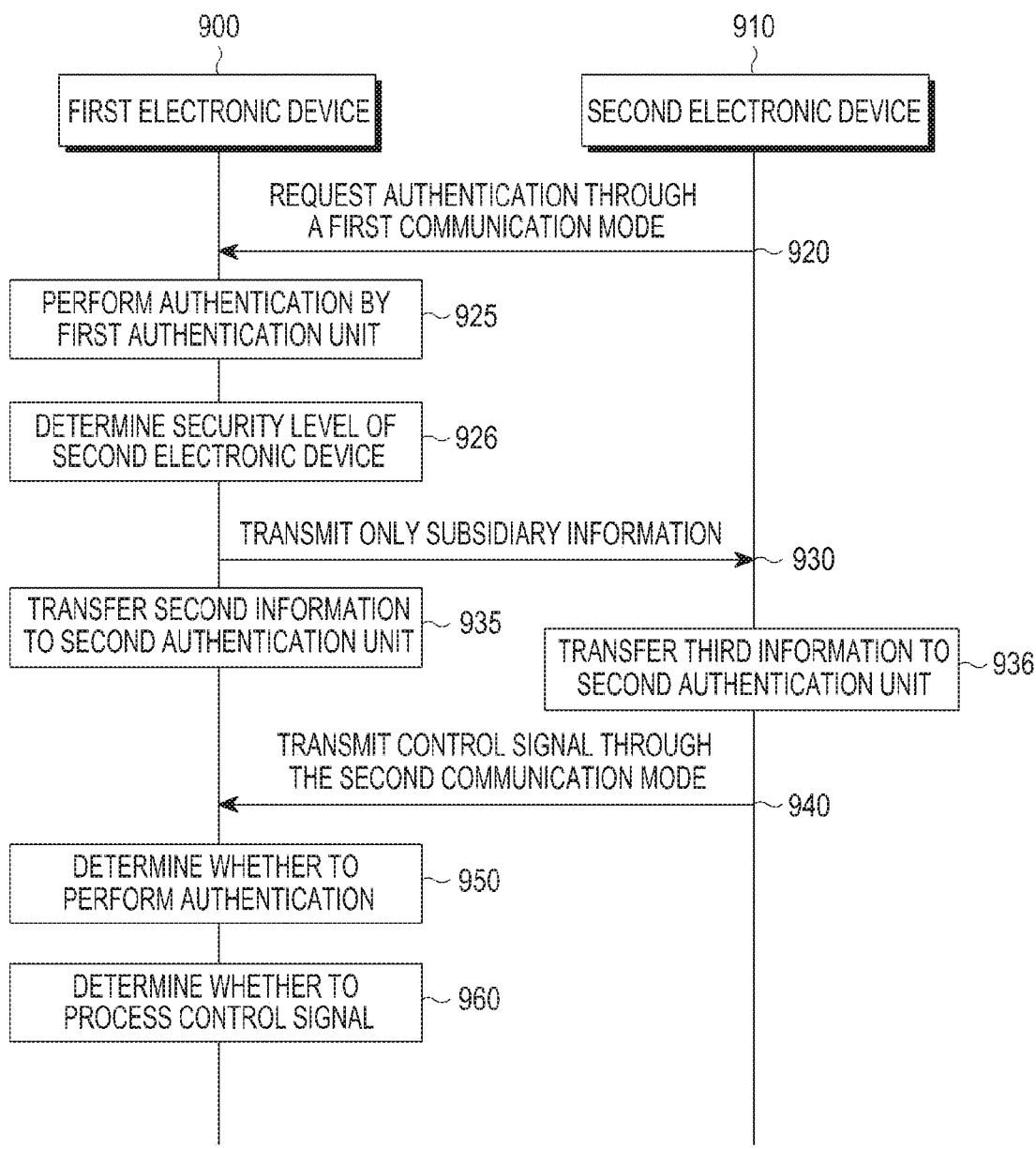
FIG. 9 is a flowchart illustrating an authentication method performed between a first electronic device and a second electronic device according to various embodiments of the present disclosure.

FIG. 9 is a flowchart illustrating an authentication method performed between a first electronic device and a second electronic device, and a control signal processing method, according to various embodiments of the present disclosure.

Referring to FIG. 9, a method for controlling a control signal is described in a case where only subsidiary information is transmitted among core information and subsidiary information included in a first information in the authentication performed between a first electronic device 900 and a second electronic device 910.

In operation 920, the second electronic device 910 requests, through the first communication mode, the first electronic device 900 to perform authentication with respect to the second electronic device 910.

In operation 925, a first authentication unit of the first electronic device 900 may perform authentication with respect to the second electronic device 910.

In operation 926, a first authentication unit of the first electronic device 900 may determine the security level of the second electronic device 910 based on a result of the authentication. For example, the first authentication unit of the first electronic device 900 determines the security level of the second electronic device 910, which is set in advance, or may determine the security level of the second electronic device 910 using authentication information received from the second electronic device 910 in the authentication process.

In operation 930, when the security level of the second electronic device 910 is set to be lower than a security level that allows the reception of the core information, or when authentication information corresponding to the security level that allows reception of the core information is not received from the second electronic device 910 in the authentication process, the first authentication unit of the first electronic device 900 transmits to the second electronic device 910 only the subsidiary information, excluding the core information.

In operation 935, the first authentication unit of the first electronic device 900 may transfer second information indicating that the second electronic device is authenticated to a second authentication unit of the first electronic device 900, which performs authentication through the second communication. For example, when only the subsidiary information is transmitted to the second electronic device 910, the first authentication unit of the first electronic device 900 may transmit to the second authentication unit of the first electronic device 900, second information including state information indicating that only the subsidiary information is transmitted.

In operation 936, a first authentication unit of the second electronic device 910 may transfer third information indicating that the second electronic device 910 is authenticated to a second authentication unit of the second electronic device 910. For example, when only the subsidiary information is transmitted from the first electronic device 900, the first authentication unit of the second electronic device 910 may transfer to the second authentication unit of the second electronic device 910, third information including state information indicating that only the subsidiary information is received.

When only the subsidiary information is received, the second electronic device 910 may determine that the second electronic device 910 is not authorized to control a core component or system of the first electronic device 900. Accordingly, the second electronic device 910 does not generate a control signal, or when a control signal is generated, the second electronic device 910 may not transmit the control signal to the first electronic device 900. In this instance, although the second electronic device 910 transmits the control signal to the first electronic device 900, the first electronic device 900 may not process the control signal. Hereinafter, descriptions will be provided for an example where the second electronic device 910 transmits the control signal to the first electronic device 900.

In operation 940, the second electronic device 910 transmits a control signal to the first electronic device 900 through the second communication mode.

In operation 950, the first electronic device 900 receives a control signal through the second communication, and determines whether to perform authentication with respect to the second electronic device 910 before processing the control signal. The first electronic device 900 determines that the second electronic device 910 is authenticated based on the second information transferred to the second authentication unit.

In operation 960, the first electronic device 900 determines whether to process the received control signal. The first electronic device 900 may determine that the second electronic device 910 is not authorized to control a component or a system associated with driving the first electronic device 110, based on the second information transferred to the second authentication unit. Accordingly, the first electronic device 900 may not process the control signal received from the second electronic device 150.

Figure 10:
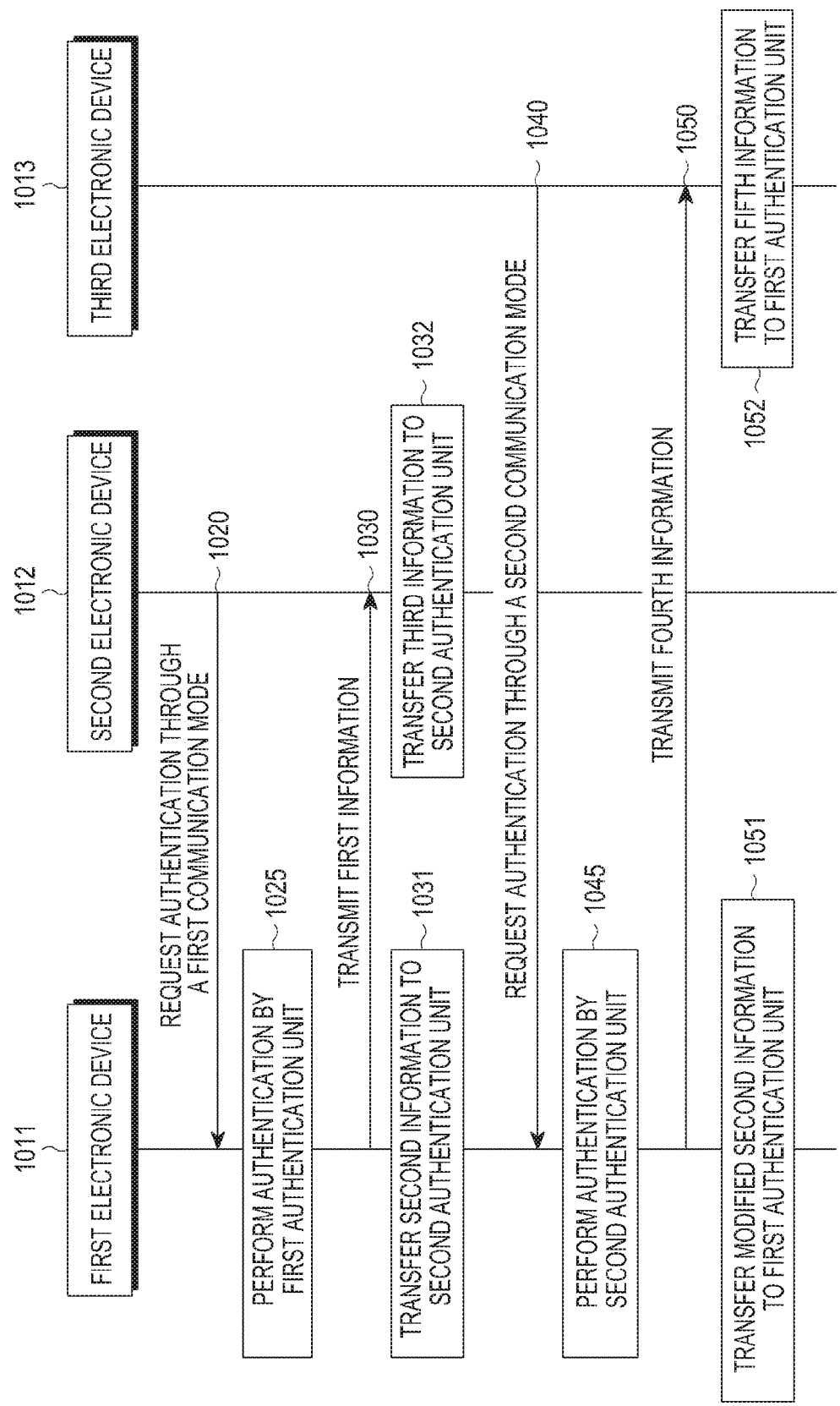
FIG. 10 is a flowchart illustrating an authentication method performed among a first electronic device, a second electronic device, and a third electronic device according to various embodiments of the present disclosure.

FIG. 10 is a flowchart illustrating an authentication method performed among a first electronic device, a second electronic device, and a third electronic device according to various embodiments of the present disclosure.

Referring to FIG. 10, a method is described in which a second electronic device 1012 and a third electronic device 1013 perform authentication with a first electronic device 1011 using different communication modes.

In operation 1020, the second electronic device 1012 requests the first electronic device 1011 to perform authentication through the first communication mode.

In operation 1025, a first authentication unit of the first electronic device 1011 performs authentication with respect to the second electronic device 1012 in response to the request for authentication that is received from the second electronic device 1012.

In operation 1030, the first authentication unit of the first electronic device 1011 transmits to the second electronic device 1012 first information used for controlling the first electronic device 1011.

In operation 1031, the first authentication unit of the first electronic device 1011 transfers second information indicating that the second electronic device 1012 is authenticated to a second authentication unit of the first electronic device 1011. Through the above, the first authentication unit may share with the second authentication unit the information indicating that the second electronic device 1012 is authenticated by transferring the second information.

In operation 1032, a first authentication unit of the second electronic device 1012 transfers third information indicating that the second electronic device 1012 is authenticated to a second authentication unit of the second electronic device 1012. Through the above, the first authentication unit may share, with the second authentication unit, the information indicating that the second electronic device 1012 is authenticated by transferring the third information. Accordingly, the second electronic device 1012 may transmit a control signal to the first electronic device 1011 irrespective of a communication mode, and the first electronic device 1011 may process the control signal irrespective of a communication mode through which the control signal is transmitted.

In operation 1040, a first authentication unit of the third electronic device 1013 requests the first electronic device 1011 to perform authentication through the second communication mode.

In operation 1045, the second authentication unit of the first electronic device 1011 performs authentication with respect to the third electronic device 1013 in response to the request for authentication that is received from the third electronic device 1013.

In operation 1050, the second authentication unit of the first electronic device 1011 transmits to the third electronic device 1013 first information used for controlling the first electronic device 1011.

In operation 1051, the second authentication unit of the first electronic device 1011 transfers modified second information indicating that the third electronic device 1013 is authenticated to the second authentication unit of the first electronic device 1011. When the third electronic device 1013 is authenticated, the second authentication unit may modify the second information that is transferred from the first authentication unit so as to indicate that the third electronic device 1013 is authenticated. Also, the second authentication unit generates information indicating that the third electronic device 1013 is authenticated and transfers the information to the first authentication unit. Through the above, the second authentication unit may share with the first authentication unit the information indicating that the third electronic device 1013 is authenticated.

In operation 1052, a second authentication unit of the third electronic device 1013 may transfer fourth information indicating that the third electronic device 1013 is authenticated to the first authentication unit of the third electronic device 1013. Through the above, the second authentication unit may share with the first authentication unit the information indicating that the third electronic device 1013 is authenticated by transferring the fourth information. Accordingly, the third electronic device 1013 may transmit a control signal to the first electronic device 1011 irrespective of a communication mode, and the first electronic device 1011 may process the control signal irrespective of a communication mode through which the control signal is transmitted.

Figure 11:
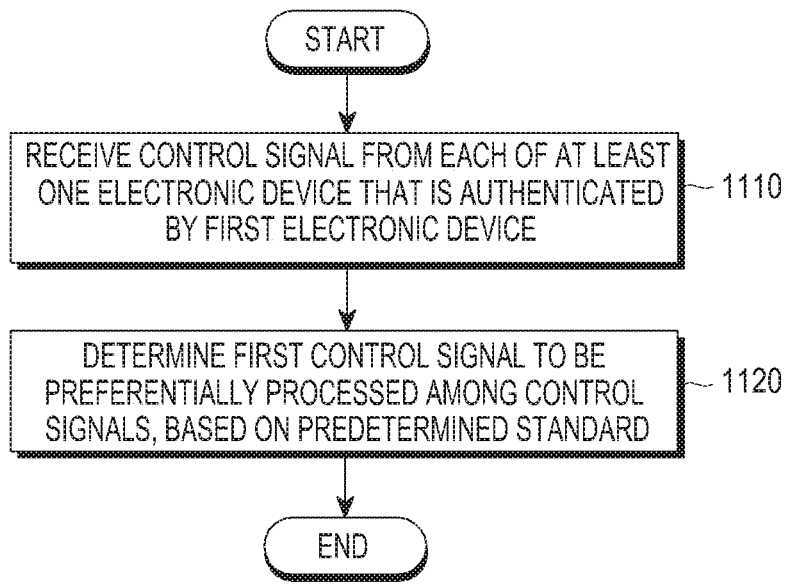
FIG. 11 is a flowchart illustrating a method for a first electronic device to process a plurality of control signals according to various embodiments of the present disclosure.

FIG. 11 is a flowchart illustrating a method for a first electronic device to process a plurality of control signals according to various embodiments of the present disclosure.

Referring to FIG. 11, in operation 1110, a first electronic device receives a control signal from each of at least one electronic device that is authenticated by the first electronic device. For example, when a plurality of electronic devices exist that are authenticated by the first electronic device, control signals may be received simultaneously from the plurality of electronic devices.

In operation 1120, the first electronic device determines a control signal to be preferentially processed among the received control signals based on a predetermined standard. When a plurality of control signals are received, the first electronic device may not process all of the control signals.

For example, when the first electronic device is a vehicle or an electronic device that is included in the vehicle to control the vehicle, the received control signals may indicate operations that contradict each other. One control signal may indicate an instruction to start the ignition, and another control signal may indicate an instruction to turn off the ignition. As described above, when a plurality of control signals are received, the first electronic device may not process all of the control signals and thus, may determine a signal to be preferentially processed based on a predetermined standard. For example, the first electronic device may determine the preferential signal based on an order of control signals received from a plurality of electronic devices. When a first control signal and a second control signal are received sequentially, the first electronic device preferentially processes the first control signal, and subsequently processes the second control signal, if at all.

A detailed method of determining the preferential signal based on a predetermined standard will be described with reference to FIGS. 12 to 15. However, the method of determining the preferential control signal described with reference to FIGS. 12 to 15, is merely an example for the purpose of description, and embodiments of the present disclosure may not be limited thereto. When a plurality of signals are received based on user's setting or various methods, it should be apparent to those skilled in the art that various methods of determining a control signal to be preferentially processed are applicable.

Figure 12:
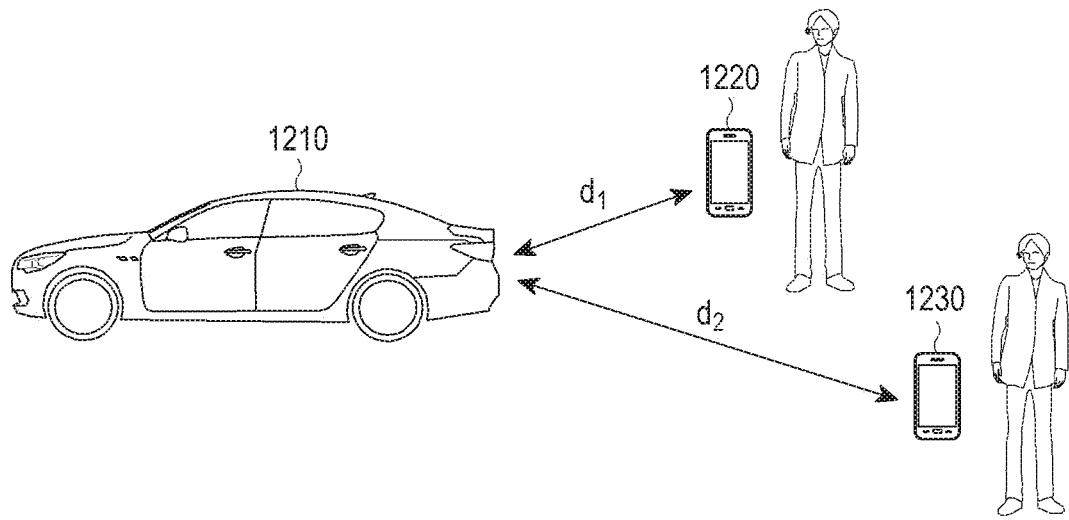
FIG. 12 is a diagram illustrating a method for a first electronic device to process a plurality of control signals based on a distance according to various embodiments of the present disclosure.

FIG. 12 is a diagram illustrating a method for a first electronic device to process a plurality of control signals based on a distance according to various embodiments of the present disclosure.

Referring to FIG. 12, a method is described for a first electronic device 1210 to determine a control signal to be preferentially processed out of received control signals based on a distance to a first electronic device 1210.

The first electronic device 1210 performs authentication with a second electronic device 1220 and a third electronic device 1230 through first communications, and receives a control signal through the first communications from each of the second electronic device 1220 and the third electronic device 1230. In this instance, the first electronic device 1210 may determine the control signal to be preferentially processed out of the received control signals based on the distance from each of the second electronic device 1220 and the third electronic device 1230 to the first electronic device 1210.

To determine the preferential control signal, the first electronic device 1210 may determine the locations of the second electronic device 1220 and the third electronic device 1230. For example, the first electronic device 1210 may determine the distance between the first electronic device 1210 and the second electronic device 1220, and the distance between the first electronic device 1210 and the third electronic device 1230, using the received control signals.

By comparing the distances, the first electronic device 1210 may determine an electronic device that is closer to the first electronic device 1210, among the second electronic device 1220 and the third electronic device 1230. For example, descriptions will be provided for the example where a distance (d1) between the second electronic device 1220 and the first electronic device 1210 is shorter than a distance (d2) between the third electronic device 1230 and the first electronic device 1210.

The first electronic device 1210 may compare the distance (d1) between the second electronic device 1220 and the first electronic device 1210 and the distance (d2) between the third electronic device 1230 and the first electronic device 1210, and may determine that the second electronic device 1220 is closer to the first electronic device 1210 than the third electronic device 1230 based on a result of the comparison. Any number of signal processing technologies can be used to determine distances (d1) and (d2) as known to those skilled in the art, therefore additional details are omitted.

Accordingly, the first electronic device 1210 determines a control signal received from the second electronic device 1220 as the preferential control signal, and processes the control signal received from the second electronic device 1220 rather than a control signal received from the third electronic device 1230. In an embodiment, the control signal received from the third electronic device 1230 may or may not be subsequently processed after processing the control signal received from the second electronic device 1220.

For example, when the second electronic device 1220 is authenticated by the first electronic device 1210, and a user of the second electronic device 1220 starts the ignition through the second electronic device 1220 and drives the first electronic device 1210, a user of the third electronic device 1230 may transmit a control signal indicating an instruction to turn off the ignition of the first electronic device 1210 from the outside of the first electronic device 1210. In this instance, the first electronic device 1210 may not subsequently process the control signal received from the third electronic device 1230.

When the second electronic device 1220 and the third electronic device 1230 are authenticated by the first electronic device 1210 based on an identical communication mode and an identical security level, the first electronic device 1210 may determine the preferential control signal based on the distance as described above. Here, an identical security level indicates that information that the second electronic device 1220 and the third electronic device 1230 provide for the authentication by the first electronic device 1210 are at the same level.

Figure 13:
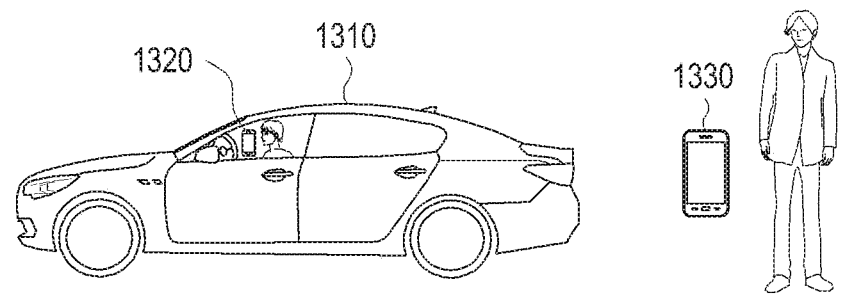
FIG. 13 is a diagram illustrating a method for a first electronic device to process a plurality of control signals based on a security level according to various embodiments of the present disclosure.

FIG. 13 is a diagram illustrating a method for a first electronic device to process a plurality of control signals based on a security level according to various embodiments of the present disclosure.

Referring to FIG. 13, a method is described for a first electronic device 1310 to determine as a control signal to be preferentially processed, a control signal received from an electronic device that inputs information corresponding to a higher security level.

In this case, a control signal received from a third electronic device 1330 that is farther from the first electronic device 1310 may need to be preferentially processed relative to a control signal received from a second electronic device 1320 that is closer to the first electronic device 1310. For example, in the case in which the first electronic device 1310 is stolen, the first electronic device 1310 needs to be controlled from outside the first electronic device 1310, although a driver exists. In this instance, when the authentication is performed with the first electronic device 1310 by providing the first electronic device 1310 with information having a higher security level than information that the driver provides to the first electronic device 1310 in the authentication process through the second electronic device 1320, the first electronic device 1310 may preferentially process a control signal received from the third electronic device 1330.

For example, when the driver performs authentication with the first electronic device 1310 using information associated with a personal identification number (PIN) of the second electronic device 1320 through NFC, a user of the third electronic device 1330 may establish a connection with the first electronic device 1310 through an LTE network, WiFi direct, or the like, and may perform authentication with the first electronic device 1310 using the information associated with a fingerprint and the PIN. When the third electronic device 1330 provides information that is set as information having a higher security level than the second electronic device 1320, a control signal received from the third electronic device 1330 may be preferentially processed relative to a control signal received from the second electronic device 1320.

In this instance, in the case of theft, by performing authentication based on the information with a higher security level, driving of the first electronic device 1310 may be remotely controlled.

Figure 14:
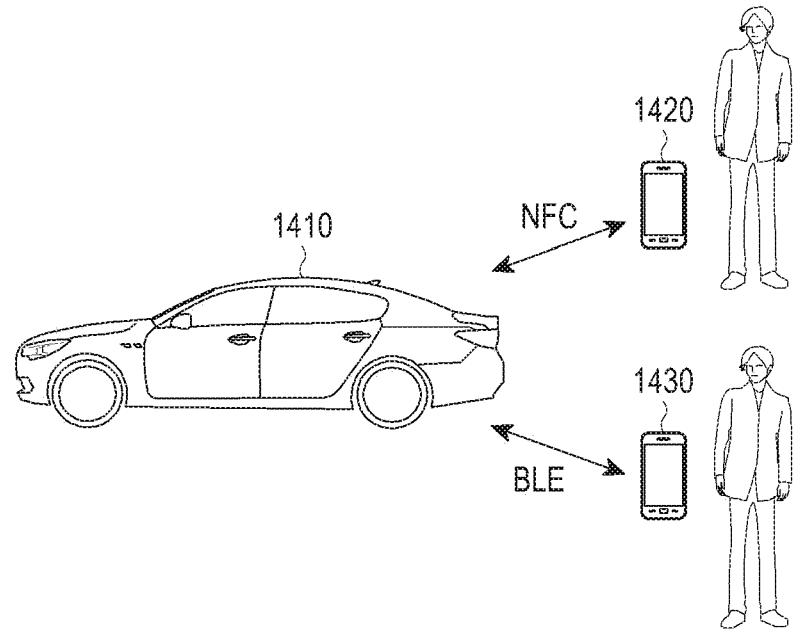
FIG. 14 is a diagram illustrating a method for a first electronic device to process a plurality of control signals based on a communication mode according to various embodiments of the present disclosure.

FIG. 14 is a diagram illustrating a method for a first electronic device to process a plurality of control signals based on a communication mode according to various embodiments of the present disclosure.

Referring to FIG. 14, a method is described for a first electronic device 1410 to determine a control signal to be preferentially processed out of received control signals based on a communication mode through which authentication is performed.

Descriptions will be provided in a case where the first electronic device 1410 performs authentication with a second electronic device 1420 through NFC, and the first electronic device 1410 performs authentication with a third electronic device 1430 through BLE. In this instance, the first electronic device 1410 may take into consideration a communication mode through which authentication is performed when determining the preferential control signal. For example, it may be set that priority is given to a communication mode that is executable over a short distance. It may also be set that preference is given to NFC over other short-range communication modes, and/or preference is given to a short-range communication mode over a network-based communication mode.

In this instance, the first electronic device 1410 may determine, as the preferential control signal, a control signal received from the second electronic device 1420 out of control signals received from the second electronic device 1420 and the third electronic device 1430. As described above, the first electronic device 1410 may determine the preferential control signal based on predetermined priorities of communication modes.

When the first electronic device 1410 receives requests for authentication from the second electronic device 1420 and the third electronic device 1430 from a distance where all of NFC, BLE, and WiFi are possible, the first electronic device 1410 may lead authentication to be performed through NFC, which is a communication mode having a highest priority.

Figure 15:
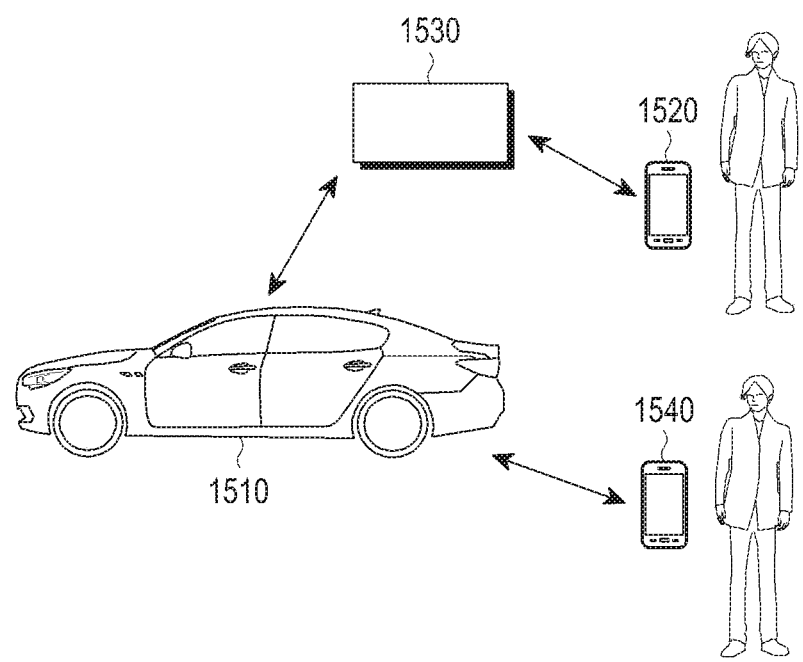
FIG. 15 is a diagram illustrating a method for a first electronic device to process a plurality of control signals based on an authentication method according to various embodiments of the present disclosure.

FIG. 15 is a diagram illustrating a method for a first electronic device to process a plurality of control signals based on an authentication method according to various embodiments of the present disclosure.

Referring to FIG. 15, a method is described for a first electronic device 1510 to determine a control signal to be preferentially processed out of received control signals based on an authentication method of each of a second electronic device 1520 and a third electronic device 1540.

Descriptions will be provided where, for example, the second electronic device 1520 performs authentication with the first electronic device 1510 through an external authentication server 1530, and the third electronic device 1540 performs authentication with the first electronic device 1510 in a D2D manner.

In this instance, the security level of the second electronic device 1520 that performs authentication through the external authentication server 1530 is set to be higher, and the security level of the third electronic device 1540 that performs authentication in a D2D manner is set to be lower. Generally, when authentication is performed through the external authentication server 1530, the security is higher than a D2D authentication method and thus, the security level may be set as described above. However, this is merely an example for the purpose of description, and embodiments may not be limited thereto and the security level may be variously set based on user's setting.

The first electronic device 1510 may determine as a preferential control signal, a control signal received from the second electronic device 1520 that performs authentication through the external authentication server 1530 with a higher security level. Accordingly, the first electronic device 1510 may preferentially process a control signal received from the second electronic device 1520 rather than a control signal received from the third electronic device 1540.

Figure 16:
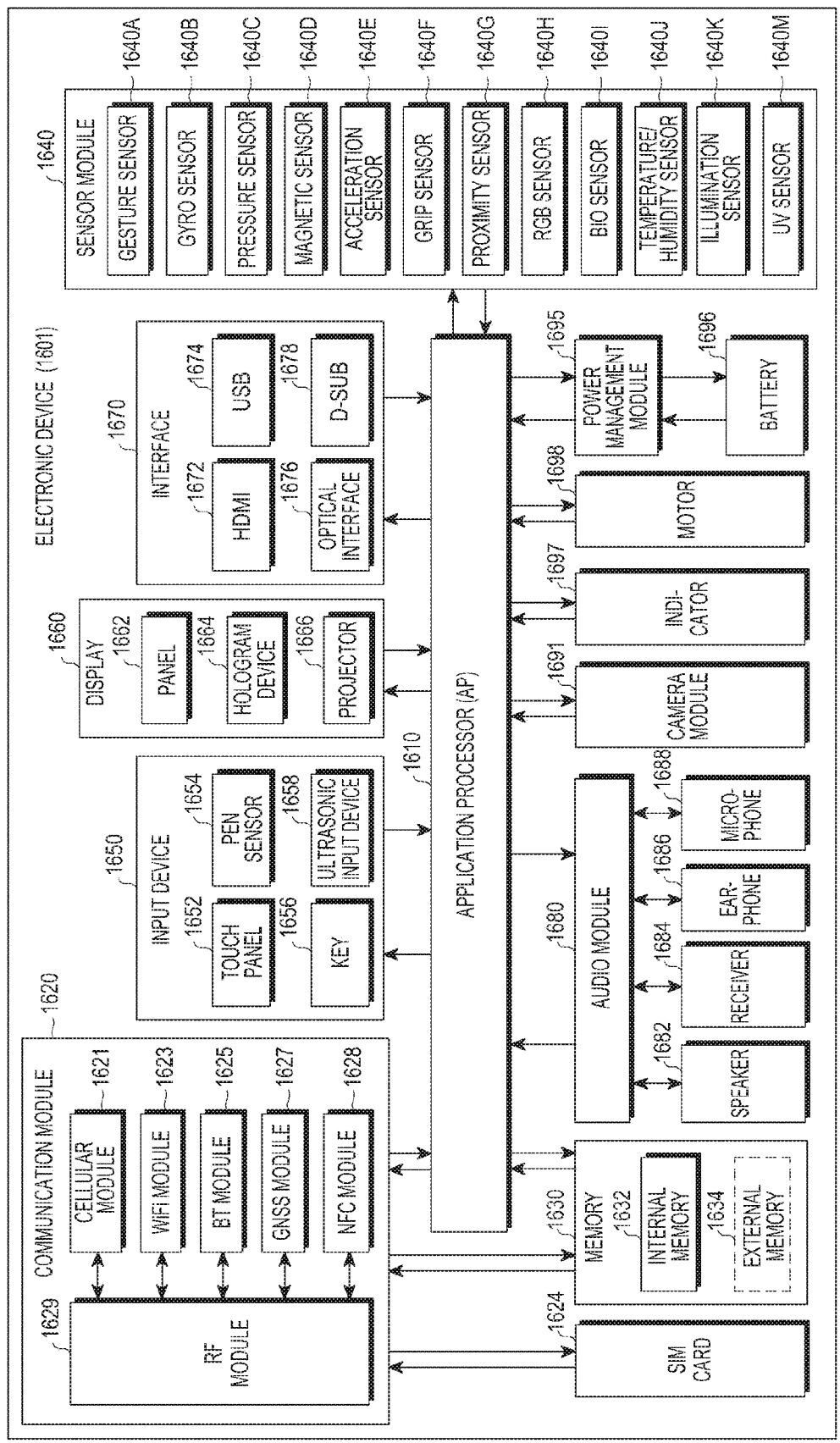
FIG. 16 is a block diagram of an electronic device according to various embodiments of the present disclosure.

FIG. 16 is a block diagram of an electronic device according to various embodiments of the present disclosure.

An electronic device 1601 may include a part or entirety of the electronic device 110 or the second electronic device 150 illustrated in FIG. 1. The electronic device 1601 includes at least one processor 1610 (e.g., an AP), a communication module 1620, a subscriber identification module 1624, a memory 1630, a sensor module 1640, an input device 1650, a display 1660, an interface 1670, an audio module 1680, a camera module 1691, a power management module 1695, a battery 1696, an indicator 1697, and a motor 1698.

Referring to FIG. 16, the processor 1610 may control a plurality of hardware or software components connected to the processor 1610 by driving an OS or an application program, and may perform processing of various pieces of data and calculations. The processor 1610 may be embodied as, for example, a system on chip (SoC). According to an embodiment of the present disclosure, the processor 1610 may further include a graphics processing unit (GPU) and/or an image signal processor (ISP). The processor 1610 may also include at least some (e.g., a cellular module 1621) of the components illustrated in FIG. 16. The processor 1610 may load, into a volatile memory, instructions or data received from at least one (e.g., a non-volatile memory) of the components and may process the loaded instructions or data, and may store various data and processing results in a non-volatile memory.

The communication module 1620 may have a configuration substantially identical or similar to that of the communication interface of FIG. 1. The communication module 1620 may include, for example, the cellular module 1621, a WiFi module 1623, a BT module 1625, a GNSS module 1627 (e.g., a GPS module, Glonass module, Beidou module, or Galileo module), an NFC module 1628, and a radio frequency (RF) module 1629.

The cellular module 1621 may provide a voice call, video call, text message service, Internet service, or the like through, for example, a communication network. According to an embodiment of the present disclosure, the cellular module 1621 may distinguish and authenticate the electronic device 1601 within a communication network using a subscriber identification module (e.g., the subscriber identification module (SIM) card 1624). According to an embodiment of the present disclosure, the cellular module 1621 may perform at least some of the functions that the processor 1610 may provide. According to an embodiment of the present disclosure, the cellular module 1621 may include a CP.

The WiFi module 1623, BT module 1625, GNSS module 1627, or NFC module 1628 may include, for example, a separate processor that processes data transmitted and received through a corresponding module. According to an embodiment of the present disclosure, at least some (e.g., two or more) of the cellular module 1621, WiFi module 1623, BT module 1625, GNSS module 1627, and NFC module 1628 may be included in a single integrated chip (IC) or IC package.

The RF module 1629 may transmit/receive, for example, a communication signal (e.g., an RF signal). The RF module 1629 may include, for example, a transceiver, power amp module (PAM), frequency filter, low noise amplifier (LNA), antenna, or the like. According to another embodiment of the present disclosure, at least one of the cellular module 1621, WiFi module 1623, BT module 1625, GNSS module 1627, and NFC module 1628 may transmit and receive RF signals through a separate RF module.

The subscriber identification module 1624 may include, for example, a card including a subscriber identity module and/or an embedded SIM, and may contain unique identification information (e.g., an integrated circuit card identifier (ICCID)) or subscriber information (e.g., an international mobile subscriber identity (IMSI)).

The memory 1630 (e.g., the storage unit 183) may include, for example, an embedded or internal memory 1632 and/or an external memory 1634. The embedded memory 1632 may include at least one of, for example, a volatile memory (e.g., a dynamic random access memory (DRAM), static RAM (SRAM), synchronous DRAM (SDRAM), and the like) and a non-volatile memory (e.g., a one-time programmable read only memory (OTPROM), PROM, erasable and programmable ROM (EPROM), electrically EPROM (EEPROM), mask ROM, flash ROM, flash memory (e.g., a NAND flash memory or NOR flash memory), hard driver, or solid state drive (SSD).

The external memory 1634 may further include a flash drive, for example, a compact flash (CF), secure digital (SD), micro-SD, mini-SD, extreme digital (xD), multimedia card (MMC), memory stick, or the like. The external memory 1634 may be functionally and/or physically connected to the electronic device 1601 through various interfaces.

The sensor module 1640 may measure a physical quantity or detect an operation state of the electronic device 1601, and may convert the measured or detected information into an electrical signal. The sensor module 1640 may include, for example, at least one of a gesture sensor 1640A, a gyro sensor 1640B, an atmospheric pressure sensor 1640C, a magnetic sensor 1640D, an acceleration sensor 1640E, a grip sensor 1640F, a proximity sensor 1640G a color sensor 1640H (e.g., a red, green, blue (RGB) sensor), a biometric sensor 1640I, a temperature/humidity sensor 1640J, an illumination sensor 1640K, and an ultraviolet (UV) sensor 1640M. Additionally or alternatively, the sensor module 1640 may include, for example, an E-nose sensor, electromyography (EMG) sensor, electroencephalogram (EEG) sensor, electrocardiogram (ECG) sensor, infrared (IR) sensor, iris sensor, and/or fingerprint sensor. The sensor module 1640 may further include a control circuit for controlling one or more sensors included therein. In various embodiments of the present disclosure, an electronic device 1601 may further include a processor configured to control the sensor module 1640 as a part of, or separately from, the processor 1610, and may control the sensor module 1640 while the processor 1610 is in a sleep state.

The input device 1650 may include, for example, a touch panel 1652, a (digital) pen sensor 1654, a key 1656, or an ultrasonic input device 1658. The touch panel 1652 may use at least one of, for example, a capacitive mode, resistive mode, infrared mode, and ultrasonic mode. Further, the touch panel 1652 may further include a control circuit. The touch panel 1652 may further include a tactile layer and provide a tactile reaction to a user.

The (digital) pen sensor 1654 may include, for example, a recognition sheet which is a part of a touch panel or is separated from a touch panel. The key 1656 may include, for example, a physical button, optical key or keypad. The ultrasonic input device 1658 may detect ultrasonic waves generated by an input tool through a microphone and determine data corresponding to the detected ultrasonic waves.

The display 1660 may include a panel 1662, a hologram device 1664, or a projector 1666. The panel 1662 may be embodied to be, for example, flexible, transparent, impact resistant, wearable, or a combination thereof. The panel 1662 and the touch panel 1652 may be embodied as one module. The hologram 1664 may show a three dimensional image in the air by using an interference of light. The projector 1666 may display an image by projecting light onto a screen. The screen may be located, for example, inside or outside the electronic device 1601. According to an embodiment of the present disclosure, the display 1660 may further include a control circuit for controlling the panel 1662, hologram device 1664, or projector 1666.

The interface 1670 may include, for example, an HDMI 1672, a USB 1674, an optical interface 1676, or a D-subminiature (D-sub) 1678. Additionally or alternatively, the interface 1670 may include, for example, a mobile high-definition link (MHL) interface, SD card/MMC interface, or infrared data association (IrDA) standard interface.

The audio module 1680 may bilaterally convert, for example, a sound and an electrical signal. At least some components of the audio module 1680 may be included in, for example, an input/output interface. The audio module 1680 may process sound information that is input or output through, for example, a speaker 1682, a receiver 1684, earphones 1686, microphone 1688, or the like.

For example, the camera module 1691 is a device that may photograph a still image and a dynamic image. According to an embodiment of the present disclosure, the camera module 1691 may include one or more image sensors (e.g., a front sensor or a back sensor), a lens, an ISP or a flash (e.g., LED or xenon lamp).

The power management module 1695 may manage, for example, power of the electronic device 1601. According to an embodiment of the present disclosure, the power management module 1695 may include a power management IC (PMIC), a charger IC, or a battery or fuel gauge. The PMIC may use a wired and/or wireless charging method. Examples of a wireless charging method may include, for example, a magnetic resonance method, magnetic induction method, electromagnetic wave method, acoustic method, and the like. Additional circuits (e.g., a coil loop, resonance circuit, rectifier, and the like) for wireless charging may be further included. The battery gauge may measure, for example, a residual quantity of the battery 1696, and a voltage, current, or temperature during charging. The battery 1696 may include, for example, a rechargeable battery and/or a solar battery.

The indicator 1697 may indicate a particular state (e.g., a booting state, message state, charging state, or the like) of the electronic device 1601 or a part (e.g., the processor 1610) of the electronic device 1601. The motor 1698 may convert an electrical signal into mechanical vibration, and may generate vibration, haptic effects, or the like. Although not illustrated, the electronic device 1601 may also include a processing device (e.g., a GPU) for supporting a mobile TV. The processing device for supporting the mobile TV may, for example, process media data according to a certain standard such as digital multimedia broadcasting (DMB), digital video broadcasting (DVB), mediaFLO™, or the like.

Each of the above-described component elements of hardware according to the present disclosure may be configured with one or more components, and the names of the corresponding component elements may vary based on the type of electronic device. The electronic device according to various embodiments of the present disclosure may include at least one of the aforementioned elements. Some elements may be omitted or other additional elements may be further included in the electronic device. Also, some of the hardware components according to various embodiments may be combined into one entity, which may perform functions identical to those of the relevant components before the combination.

The term "module" as used herein may, for example, mean a unit including one of hardware, software, firmware or a combination of two or more thereof. The term "module" may be interchangeably used with, for example, the term "unit", "logic", "logical block", "component", or "circuit". A "module" may be a minimum unit of an integrated component element or a part thereof. A "module" may also be a minimum unit for performing one or more functions or a part thereof. In each case, the "module" may be mechanically and/or electronically implemented. For example, a "module" according to embodiments of the present disclosure may include at least one of an application-specific integrated circuit (ASIC) chip, field-programmable gate array (FPGA), and programmable-logic device for performing operations, which are known or are to be developed.

According to various embodiments, at least some of the devices (e.g., modules or functions thereof) or the methods (e.g., operations) according to the present disclosure may be implemented by a command stored in a non-transitory, computer-readable storage medium in a programming module form. When a command is performed by a processor (e.g., when a command is performed by the controller 140 of the first electronic device or the controller 180 of the second electronic device), the at least one processor may perform a function corresponding to the command. The non-transitory, computer-readable storage medium may be, for example, the first storage unit 131 of the first electronic device, the second storage unit 143 of the first electronic device, the first storage unit 171 of the second electronic device, and/or the second storage unit 183 of the second electronic device.

The computer readable recoding medium may include a hard disk, floppy disk, magnetic media (e.g., a magnetic tape), optical media (e.g., a compact disc ROM (CD-ROM) and DVD), magneto-optical media (e.g., a floptical disk), hardware device (e.g., a ROM, RAM, flash memory), and the like. In addition, the program instructions may include high class language codes, which can be executed in a computer by using an interpreter, as well as machine codes made by a compiler. The aforementioned hardware devices may be configured to operate as one or more software modules in order to perform the operation of the present disclosure, and vice versa.

The programming modules according to the present disclosure may include one or more of the aforementioned components or may further include other additional components, or some of the aforementioned components may be omitted. Operations executed by a module, programming module, or other component elements according to various embodiments of the present disclosure may be executed sequentially, in parallel, repeatedly, or in a heuristic manner. Further, some operations may be executed according to another order or may be omitted, or other operations may be added.

According to various embodiments of the present disclosure, there is provided a storage medium that stores instructions, wherein the instructions are set to enable at least one processor to execute at least one operation when the instructions are executed by the one or more processors, the one or more operations including performing by a first authentication unit through a first communication, authentication with respect to a second electronic device that requests authentication and when the second electronic device is authenticated, transmitting first information used for controlling the first electronic device to the second electronic device through the first communication and transferring second information indicating that the second electronic device is authenticated to a second authentication unit in the first electronic device, wherein the second authentication unit performs authentication through a second communication.

While the present disclosure has been shown and described with reference to various embodiments thereof, it will be understood by those skilled in the art that various changes in form and detail may be made therein without departing from the spirit and scope of the present disclosure as defined by the appended claims and their equivalents.

What is claimed is:

1. An electronic device that executes authentication, the electronic device comprising:
    a first authenticator configured to perform an authentication with respect to another electronic device, the other electronic device being configured to request authentication from the first authenticator through a first type of communication; and
    a second authenticator configured to perform authentication through a second type of communication,
    wherein the first authenticator is further configured to:
        transmit first information used for controlling the electronic device to the other electronic device through the first type of communication if the other electronic device has been authenticated, and
        transfer second information indicating that the other electronic device has been authenticated, to the second authenticator.

2. The electronic device of claim 1, wherein the first authenticator is further configured to transmit at least one of an authority or a security key in association with the first information to the other electronic device through the first type of communication.

3. The electronic device of claim 1,
    wherein the first authenticator is further configured to transfer at least one of an authority or a security key in association with the second information to the second authenticator, and
    wherein the second authenticator is further configured to ascertain the second information using at least one of the authority or the security key in association with the second information in a secure area that is virtually set in the electronic device.

4. The electronic device of claim 1, further comprising:
    at least one processor configured to determine whether the other electronic device is authenticated based on the second information that is transferred to the second authenticator if a control signal is received from the other electronic device through the second type of communication.

5. The electronic device of claim 4, wherein the at least one processor is further configured to perform communication with the other electronic device through the second type of communication if it is determined that the other electronic device is authenticated.

6. The electronic device of claim 1, wherein each of the first authenticator and the second authenticator is further configured to perform authentication with respect to the other electronic device by using an external authentication server.

7. The electronic device of claim 1, wherein the second information is included in state information for operating the electronic device.

8. The first electronic device of claim 1, further comprising:
    a first hardware module comprising the first authenticator;
    a transceiver configured to perform communication through the first type of communication; and
    a memory configured to store the first information.

9. The first electronic device of claim 1, further comprising:
    at least one processor configured to:
        receive a control signal from the other electronic device that has been authenticated by the electronic device,
        determine, if there is a plurality of other electronic devices, a control signal to be preferentially processed among the received control signals based on a predetermined standard, and
        process the determined control signal.

10. The first electronic device of claim 9, wherein the predetermined standard comprises at least one of:
    a distance between the other electronic device and the electronic device,
    a security level of authentication performed between the other electronic device and the electronic device,
    a communication used for authentication performed between the other electronic device and the electronic device,
    a communication connection state of the plurality of other electronic device, and
    an order of a control signal received from the other electronic devices.

11. A method for performing authentication in an electronic device, the method comprising:
    receiving a request to a first authenticator of the electronic device for authentication from another electronic device through a first type of communication;
    performing, by the first authenticator of the electronic device, authentication with respect to the other electronic device;

transmitting first information used for controlling the electronic device to the other electronic device through the first type of communication if the other electronic device has been authenticated; and transferring second information indicating that the other electronic device has been authenticated, to a second authenticator in the electronic device, wherein the second authenticator, performs authentication through a second type of communication.

12. The method of claim 11, wherein the transmitting of the first information to the other electronic device comprises:

transmitting at least one of an authority or a security key in association with the first information to the other electronic device through the first type of communication.

13. The method of claim 11, wherein the transferring of the second information comprises:

further transferring at least one of an authority or a security key in association with the second information to the second authenticator, and controlling the second authenticator to ascertain the second information by using at least one of the authority or the security key in association with the second information in a secure area that is virtually set in the electronic device.

14. The method of claim 11, further comprising:

determining whether the other electronic device is authenticated based on the second information if a control signal is received from the other electronic device through the second type of communication; and performing communication with the other electronic device through the second type of communication if it is determined that the other electronic device is authenticated.

15. An electronic device that performs authentication, the electronic device comprising:

a first authenticator configured to request authentication with respect to the electronic device through a first type of communication; and a second authenticator configured to perform authentication through a second type of communication, wherein the first authenticator is further configured to:

receive first information used for controlling another electronic device from the other electronic device through the first type of communication if the electronic device has been authenticated, and transfer second information indicating that the electronic device has been authenticated to the second authenticator.

16. The electronic device of claim 15, wherein the first authenticator is further configured to:

receive at least one of an authority or a security key in association with the first information through the first type of communication, and transfer at least one of an authority or a security key in association with the second information to the second authenticator.

17. The electronic device of claim 16, wherein the second authenticator is further configured to ascertain the second information using at least one of an authority or a security key in association with the second information in a secure area that is virtually set in the electronic device.

18. The electronic device of claim 15, further comprising:
a first hardware module,
wherein the first hardware module comprises:
the first authenticator,
a transceiver configured to perform communication through the first type of communication, and
a memory configured to store the received first information.

19. The electronic device of claim 15, further comprising:
at least one processor configured to transmit a control signal for controlling the other electronic device using the received first information to the other electronic device.

20. The electronic device of claim 15, further comprising:
at least one processor configured to perform communication with the other electronic device through the second type of communication in response to an event in which the second authenticator receives the second information.

* * * * *